United States Patent [19]
Jain et al.

[11] Patent Number: 5,983,237
[45] Date of Patent: Nov. 9, 1999

[54] VISUAL DICTIONARY

[75] Inventors: Ramesh Jain, San Diego; Amarnath Gupta, Redwood City, both of Calif.; Arun Hampapur, White Plains, N.Y.; Bradley Horowitz, San Mateo, Calif.

[73] Assignee: Virage, Inc., San Mateo, Calif.

[21] Appl. No.: 08/916,904

[22] Filed: Aug. 21, 1997

Related U.S. Application Data

[63] Continuation-in-part of application No. 08/829,791, Mar. 28, 1997
[60] Provisional application No. 60/014,893, Mar. 29, 1996, abandoned, and provisional application No. 60/025,212, Aug. 21, 1996.

[51] Int. Cl.$^6$ .................................................. G06F 17/30
[52] U.S. Cl. .................................. 707/104; 707/3; 707/7; 707/527; 345/333; 345/334
[58] Field of Search .............................. 707/7, 527, 518, 707/104, 1, 4, 3, 2, 5, 6, 526; 345/333, 334, 348; 704/9; 386/96, 305

[56] References Cited

U.S. PATENT DOCUMENTS

| 4,672,683 | 6/1987 | Matsueda | 382/305 |
| 5,164,992 | 11/1992 | Turk et al. | 382/2 |

(List continued on next page.)

FOREIGN PATENT DOCUMENTS

| 63-201883 | 2/1990 | Japan | G06F 15/60 |

OTHER PUBLICATIONS

Abad–Mota, S. and Kulikowski, C, IEEE, pp. 20–28, 1995, "Semantic Queries on Image Databases: The IMTKAS Model".

Chang, S., Smith, J., and Wang, H., Columbia University/CTR Technical Report #408–95–14,*paper,* pp. 1–20, 1995, "Automatic Feature Extraction and Indexing for Content–Based Visual Query".

Chua, T. and Ruan, L., ACM Transactions on Information Systems, 13(4):373–407, Oct. 1995, "A Video Retrieval and Sequencing System".

Croft, W.B. and Thompson, R.H., Journal of the American Society for Information Science, 38(6):386–404, 1987. "I$^3$R: A New Approach to the Design of Document Retrieval Systems".

(List continued on next page.)

*Primary Examiner*—Paul R. Lintz
*Assistant Examiner*—Thu-Thao Havan
*Attorney, Agent, or Firm*—Knobbe Marten Olson & Bear LLP

[57] ABSTRACT

A system and method for improving the retrieval performance of a query engine in a visual information retrieval (VIR) system by encoding domain-specific knowledge into the VIR system through a visual dictionary or "victionary". The victionary is a dictionary-like information-mapping module that is used to retrieve visual information at a "semantic" level. A VIR system that performs generic image processing is enhanced by adding a query transformation unit and a query expansion unit, i.e., the victionary. With these additional components, a user may present a query either as a text term (such as a keyword or phrase), or as an image (with weights) and execute a "semantic query". During semantic query processing, the victionary-enhanced system transforms the user's original term (or image query) to a set of equivalent queries, and internally executes all the equivalent queries before presenting the results to the user. The victionary unit is responsible for taking the term (or image query) and finding the equivalent feature vectors (and weights). A result processor accumulates the score sheets of each equivalent query and presents a composite ranking that reflects a faithful representation of each equivalent query to the user. The architecture of the victionary-enhanced system is open and extensible, so that one or more domain-specific victionary modules can be plugged into the system. The plug-in architecture of the victionary module is effected through an application programming interface (API).

50 Claims, 21 Drawing Sheets

U.S. PATENT DOCUMENTS

| | | | |
|---|---|---|---|
| 5,339,392 | 8/1994 | Risbert et al. | 345/333 |
| 5,579,471 | 11/1996 | Barber et al. | 345/348 |
| 5,748,190 | 5/1998 | Kjorsvik | 707/10 |
| 5,778,403 | 7/1998 | Bangs | 707/527 |
| 5,819,288 | 10/1998 | De Bonet | 707/104 |
| 5,835,667 | 11/1998 | Wactlar et al. | 386/96 |
| 5,844,554 | 12/1998 | Geller et al. | 345/333 |
| 5,893,095 | 4/1999 | Jain et al. | 707/6 |

OTHER PUBLICATIONS

Gupta, A., *Virage, Inc., paper*, pp. 1–10, Oct. 4, 1995, "Visual Information Retrieval Technology: A Virage Perspective".

Hamano, T., IEEE, pp. 149–154, 1988, "A Similarity Retrieval Method for Image Databases Using Simple Graphics".

Lohse, et al., Communications of the ACM, 37(12):36–49, Dec. 1994, "A Classification of Visual Representations".

Picard, R., M.I.T. Media Laboratory Perceptual Computing Section Technical Report No. 358, pp. 1–6, 1995, "Toward a Visual Thesaurus".

Romer, D, *Seminar Presentation,* The Getty Art History Information Program, http://www.ahip.getty.edu/agenda/hypermail/0000.html#anchor–20, 1995, "Image and Multimedia Retrival".

Wachman, J.S., "A video browser that learns by example." Master's thesis, MIT Media Lab, Cambridge, MA, May 1996.

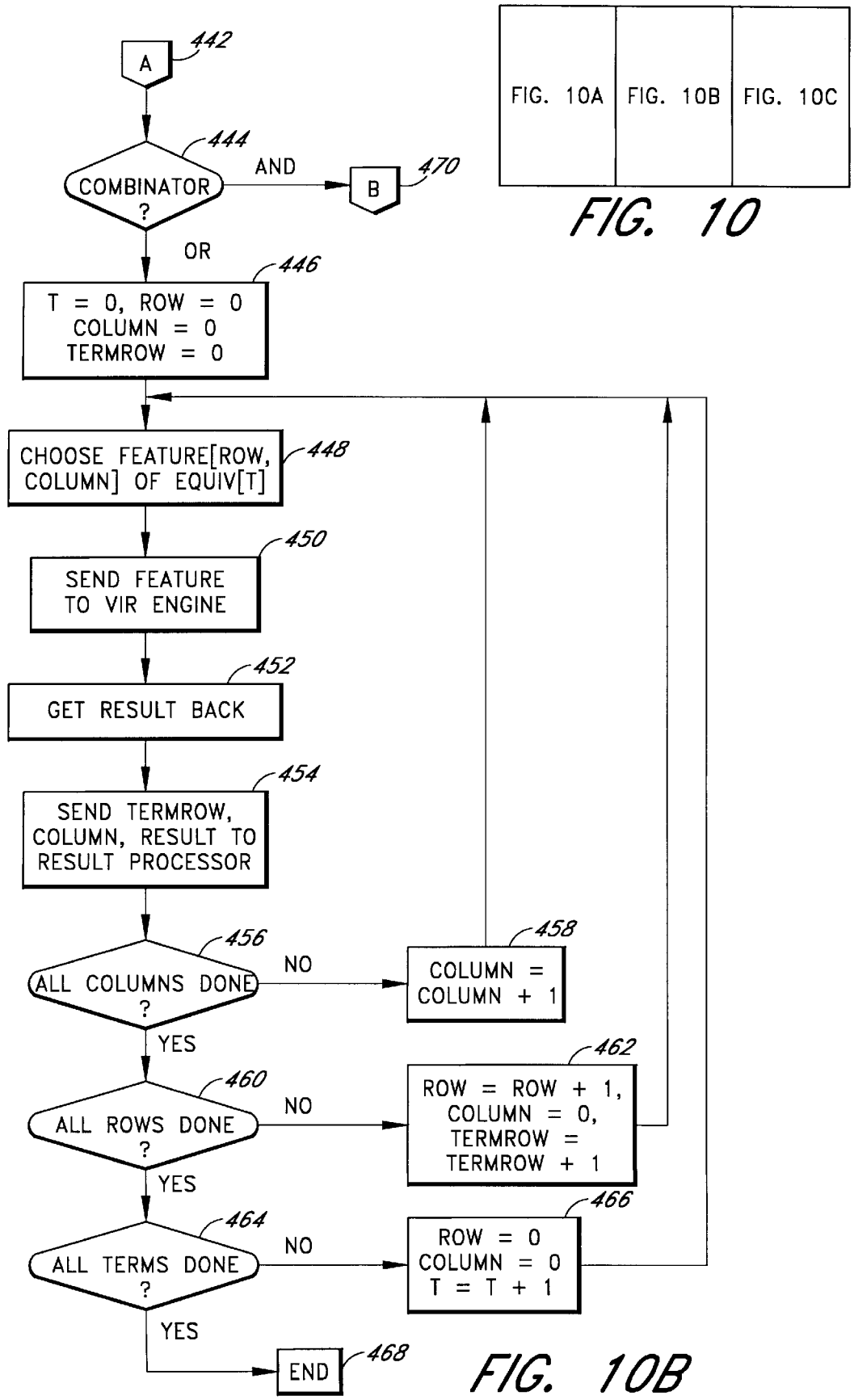

FLOWCHART FOR CONTROL UNIT AND CONCEPT MANAGER OF VICTIONARY

FLOWCHART FOR ASSOCIATION MANAGER OF VICTIONARY

VISUAL DICTIONARY

RELATED APPLICATIONS

This application claims the benefit of the filing date of U.S. Provisional Application No. 60/025212, filed Aug. 21, 1996, for "VISUAL DICTIONARY", to Jain, et al. This application is a continuation-in-part of U.S. application Ser. No. 08/829,791, filed Mar. 28, 1997, for "SIMILARITY ENGINE FOR CONTENT-BASED RETRIEVAL OF OBJECTS" to Jain, et al., which claims the benefit of U.S. Provisional Application No. 60/014,893, filed Mar. 29, 1996, now abandoned.

BACKGROUND OF THE INVENTION

1. Field of the Invention

The present invention relates to database systems. More specifically, the invention is directed to a system for improving the performance of retrieving visual information from a database.

2. Description of the Related Technology

The emergent field of Visual Information Retrieval (VIR) has a purpose of developing techniques and systems to extract and access the content of visual media, which include images and videos. It is intended that the users of VIR systems are able to search through repositories of visual information just as in a textual database but without requiring that the visual media objects be pre-annotated with textual descriptors.

An important class of queries of query posed to a VIR system is a similarity query, where the user presents a clue to the system as a description of what he or she is looking for. The clue may be posited by:

- a visual example, such as a similar picture;
- a sketch drawn to depict the search item;
- a set of keywords that describe the search item;
- a set of additional criteria, such as whether the user is more interested in the color of the visual media object, the relative sizes and spatial arrangements of interesting regions within the visual media object, and so on.

In all of these cases, the user expects that the system will locate those visual media instances that match the clue from a database. To the user, the performance of a VIR system is primarily judged by the degree to which the retrieved results correspond to the intent of the user-specified clue. However, it is very difficult to capture the intent of the user in a generic VIR system because of numerous reasons, such as:

- two users may use the same clue with different intents;
- a user may use different clues with the same intent;
- the system cannot determine which aspect of the clue contains the real intent of the user.

It has been generally argued both in the database literature, e.g., S. Abad-Mota and C. A. Kulikowski, "Semantic queries on image databases: the IMTKAS model", *Proc. Basque International Workshop on Info. Tech.*, San Sabastian, Spain, pp. 20–28, 1995, and in the information retrieval literature, e.g., W. B. Croft and R. H. Thompson, "IIIR: a new approach to the design of a document retrieval system", *J. Amer. Soc. Info. Sci.*, vol. 38, pp. 308–404, 1987, that the retrieval performance improves if the system is knowledge-based. Knowledge here refers to a body of facts about the application domain, which is independent of media data. A VIR system is knowledge-based if some mechanism of the system utilizes this body of facts for extraction and/or retrieval of visual information. The addressed problem is: what form of knowledge is suitable for a VIR system and how to encode this knowledge into a generic VIR system in such a manner that the knowledge encoding module is flexible, customizable and can be easily changed if the user bias or application domain changes in a predictable manner. In this case, the reduction in search time as the criterion of performance as used by database researchers is not referred to, but to the quality of results as measured by precision (ratio of the number of correct results to total number of results retrieved by the system), recall (ratio of number of correct results retrieved by the system to the total number of correct results that should have been retrieved by the system) andfallout (fraction of false positives retrieved by the system) used by the Information Retrieval community. Current VIR systems (discussed further hereinbelow) until now do not have such a flexible knowledge-encoding module to improve an accepted effectiveness metric such as the well known Van Rijsbergen's formula $F(X)=[(X^2+1) * P * R]/[X^2 * P+R]$, where * indicates multiplication, P and R denote precision and recall respectively, and x is a free parameter to quantify the relative importance of precision and recall.

What is needed is a visual knowledge encoding mechanism that solves the above described problem. It would be desirable for such a mechanism to be utilized as a plug-in component in a VIR architecture.

There are three categories of work that are related to the current invention: current VIR systems, text retrieval systems, and computer vision and pattern recognition. The majority of this work relates to recently emerging technologies. These categories are described as follows:

1. Current VIR Systems: There are several types of VIR systems currently available as research prototypes or commercial systems. FIG. 1 shows a block diagram of a computer-implemented system 100 with VIR capabilities. The system includes a computer, such as an Indy available from Silicon Graphics, Inc. Other computers, such as those based on the Alpha processor from Digital Equipment Corp., the Pentium family of processors from Intel, or the SPARC processor from Sun Microsystems, could be alternatively used. A visual display 104 is connected to the computer 102. User input 106 is received through any of a variety of input devices such as a keyboard, a mouse, or other pointing devices (not shown). A visual information retrieval system 110, a database management system (DBMS) 112 and an operating system (OS) 114 are also part of the computer-implemented system 100. A database 108 interfaces with the DBMS 112 and OS 114. The DBMS 112 is available from many vendors, such as the Universal Server marketed by Informix Software Inc., the Oracle8 Universal Data Server marketed by Oracle Corp., the DB2 system available from IBM, or the Sybase DBMS. The OS may be any of a variety of available operating systems, such as Unix, Microsoft Windows NT, or Solaris.

FIG. 2 shows the general structure inside the VIR system 110. The VIR system 110 preferably includes a user interface 130, an insertion module 132, a database interface 134 and a query module 136. The user interface 130 receives user input and queries 106 (FIG. 1) by use of one or more input devices. The user interface 130 sends an image to be inserted into the DBMS 112 (FIG. 1) and metadata to the insertion module 132. Metadata is information about the image, particularly information that is useful for query purposes. Examples of metadata include the date a photographic image is created and the name of the photographer. The insertion module generates a feature vector for the image and sends the feature vector with the metadata to the database interface 134 for storage by the DBMS 112. The user interface also sends a user query to the query module 136. The query module 136 processes the query to generate a database query that is send through the database interface 134 to the DBMS 112. The database interface 134 receives results back from the DBMS 112 and sends the results to the user interface 130 through the query module 136.

For the current VIR system category, there are four main types of systems: keywords only, generic image analysis, domain specific image analysis, and keywords together with image properties. These four system types are described as follows:

a) Systems that use keywords only: Many commercial systems associate keywords with images. The user places a search request by typing in some query words, and the system retrieves the images containing the same words. A variation of this is to use a text thesaurus. In this case, the system searches for the keywords and their synonyms. Hence a query for "car" will match an image record annotated as "automobile".

Such a method has been used for video retrieval described by T-S. Chua and L-Q. Ruan, "A video retrieval and sequencing system", *ACM Trans. Info. Syst.*, vol. 13(4), pp. 373–407, 1995.

FIG. 3 shows a block diagram of a keyword-based image/video retrieval system 150. A query interface 152 receives keywords supplied by the user of the system 150. For this system 150, the query consists of a set of terms, i.e., keywords or phrases, which are connected together by operators, such as AND, OR, NOT and NEAR, as permitted by the underlying text database. The query is parsed by a query parser 154 to generate a query in text database format. The query is then "processed" by a text database 156, which returns the ranked list of asset identifiers (IDs) of those images that qualify the query conditions to a result processor 158. The result processor 158 then fetches the corresponding images (or their thumbnail representations) or video frames from an image repository 160 and presents the results to the user by use of a results interface 162.

The problem with these keyword-only systems is that they are extremely dependent on the annotation. Hence, a user searching for "sunset" will never retrieve an image annotated with the keyword "San Francisco" even though the image may actually show a sunset in San Francisco. What is desired is to use keywords if available, but to retrieve a visual media instance if it matches the same concept as intended by the query keyword, although the instance retrieved may have different or no keywords associated with it.

b) Systems that perform generic image analysis: Many research systems, such as the projects at Columbia University, University of Chicago, University of Massachusetts and University of California-Santa Barbara, and a few commercial systems, such as the Virage VIR Engine, Excalibur Visual Retrievalware and IBM QBIC, use image processing techniques to extract some properties from the image. Among the most common properties are color, texture and shape of user-designated image regions. These abstracted properties are stored in a composite data structure called a feature vector. Applicant's VIR system for image analysis is described in copending application Ser. No. 08/829,791, filed Mar. 28, 1997, for "SIMILARITY ENGINE FOR CONTENT-BASED RETRIEVAL OF OBJECTS" to Jain, et al., which is herein incorporated by reference.

FIG. 4 shows a block diagram that illustrates the structure and function of a typical VIR system 200 that performs image analysis. The database 112 (FIG. 1) stores a set of feature vectors of images that are stored therein. The user presents a query through an interface 202. The query specifies an example image, and a set of weights, which indicates the user's relative preferences of individual properties. A query parser 204 converts the user's query into an internal form (query structure) that a query processor 206 can recognize. This may involve analyzing the example image to extract its feature vector. The query processor executes the query by retrieving feature vectors from the database (using a database interface 208), comparing them against the example feature vector and creating a score sheet indicating the similarity of each retrieved image to the example image. A result processor 210 uses this score sheet and the user defined weights to compute a final ranked list. Images (or their thumbnail representations) corresponding to the ranked list are retrieved from the database interface 208 and presented to the user through the results interface 212. The VIR system 200 may include a query refinement interface 214 that sends refinement parameters based on user input to a query refinement processor 216 for modification of a query. The query refinement processor 216 may send a new query structure for refinement of the database query to the query processor 206 to produce a new set of query results and/or may send a refinement request to the result processor 210 to refine the prior set of query results. One type of query refinement is weight manipulation.

Although these systems work well for query-by example cases, they are very dependent upon the properties of the example that is used as the clue. Hence, for these systems, if the query image shows a white bird flying in blue sky above some trees, the system may not ever retrieve (or rank high) an image of a bird silhouette flying against a dark red sunset over a sea, because the characteristics of these two images are very different. If the user's intent was to find a flying bird, the heavy dependence on the query example will lead to unsatisfactory performance.

c) Systems that perform domain specific image analysis: Some very domain-specific systems, such as the face-recognition system of Pentland (U.S. Pat. No. 5,164,992), use prior training to enable the query engine to find similar images that are intuitively meaningful. However, these systems work only within the scope of the intended domain, are not easily extensible, and are not suitable for a database with a heterogeneous content.

d) Systems using keywords and image properties: A few recent systems, such as the Photodisc system, have started using textual image descriptors together with computed image properties. These systems accept both textual query terms and an image example as input. Typically, they first issue a text query as in the keyword-only systems described above, and get back a set of image identifiers that satisfy the query. Next, they take this resulting set of images and perform an image similarity query, such as performed by the generic image analysis systems described above. These systems work very well for properly annotated databases, but suffer the same defects as the keyword-only systems and the generic image analysis systems.

An interesting variant of this theme was used in the Japanese patent application to Akio Hamano (Kokai Patent Application No. HEI 2-51775 [1990]) of Nippon Telegram and Telephone Public Corporation. The Hamano patent starts with the assumption that each image shows a number of objects, and for each object, the name and spatial properties of the objects (size, position, and attitude) are stored by the system. Further, the system stores a "schematic diagram" for each image to depict the relative positions (e.g., "fore and aft relationship") of these objects. The user initiates a query by selecting an image, and inputting a keyword, such as "apple". The system retrieves a default property list for the object having the keyword. It also presents the schematic diagram data corresponding to this keyword for the current image. The user is allowed to interactively modify either the property list (e.g., make the apple bigger) and the relationships depicted in the schematic diagram (e.g., move it from the center of the desk to a corner"), through a graphical interface. When all objects pertaining to a desired image are thus modified, the system computes a "similarity criterion" from the edited image to search the database. For example, if the position of the apple was modified from p1 to p2, it creates a rectangular region around p2, to look for an apple in the database. It is important to note that the system is still looking for an apple using keyword annotations of the images in the database. The characteristic of the patent is that when it finds a candidate image in the database containing an apple by keyword search, it screens the image by comparing the similarity criteria set by the user with the schematic diagram and properties of the apple in the candidate image.

2. Text Retrieval Systems: Many text retrieval systems use the notion of "query expansion", where an original query term is substituted by a list of other closely related terms. These close terms may be generated by adding suffixes using grammatical rules, by a set of synonyms found using a thesaurus lookup, by a relational knowledge representation structure like frame-networks, or by a natural language processing technique which helps the system disambiguate the word sense. Since these methods have been useful for complex queries in text retrieval systems, equivalent methods have been developed for use in VIR systems. However, because of the very different characteristics of text and visual information, any direct implementation of these methods for visual media is not meaningful. Explicit visual thesauri, although alluded to by some researchers such as D. Romer, Presentation at the seminar entitled "Towards a research agenda for cultural heritage in information networks", The Getty Art History Information Program, 1995, are not yet a reality, because the specification, implementation and use of such a mechanism has not been demonstrated. In fact, the only direct reference of a visual thesaurus in Romer, namely G. L. Lohse, K. Bilosi, N. Walker and H. H. Reuter "A Classification of Visual Representations", *Communications of the ACM*, Vol. 37(12), pp. 36–49, 1994, researches in a taxonomy of user perceptions of graphical entities like charts, graphs, icons, and pictures, and has no "synonym-" or "antonym-" like functionality that the notion of "thesaurus" implies.

3. Current Computer Vision and Pattern Recognition Research: Recently researchers in computer vision and pattern recognition have approached the problem of visual information retrieval from a semantic object modeling and retrieval point of view. These research prototypes use one or more feature extraction techniques to model semantic concepts such as fire, people, and sky by user provided examples, and then use these models for retrieval. For example, some of the prototypes segment images, combine color, texture and shape information into composite groupings, and conduct a learning procedure from user-specified labels to one cluster per concept.

While these methods also attempt to capture user intent by associating features with concept, they are targeted at objectives different from the current invention. First, the mapping of one cluster to a concept is not a practical database solution to a VIR system. It is impossible to devise a clustering algorithm that will put a blue sky and a red sky of dusk in the same cluster, without misclassifying it with a lot of "non-sky" regions having smooth textures. Secondly, while the emphasis of these groups is in model building through application of suitable learning techniques for grouping features, what is desired is exemplar collection, and not model building. Although model building by learning is one way to create a victionary, the crucial point is to have a number of example cases, which would trigger a number of sufficiently diverse "expanded subqueries" that form disjunctive descriptors of the user intent. Thirdly, the focus of this invention is in query processing in VIR systems, and on the functional requirement specification of the victionary that aids the query process, and not on any specific implementation that may yield the specifications covered herein. For the purpose of this invention therefore, the existing research ideas are potentially deployable tools, but not conceptual building blocks.

SUMMARY OF THE INVENTION

One aspect of the present invention includes a method to improve the retrieval performance of a query engine in a VIR system by encoding domain-specific knowledge into the VIR system through a dictionary-like information-mapping module, termed a visual dictionary or "victionary". The role of the victionary is to retrieve visual information at a more "semantic" level than is possible by the current VIR systems. The victionary as a visual knowledge encoding mechanism, and as a plug-in component in a VIR architecture, fulfills the previously mentioned needs described above.

The present invention extends a visual information system that performs generic image processing, by adding a query transformation unit and a query expansion unit called the victionary. With these additional components, a user may present a query either as a text term (such as a keyword or phrase, called a "term" hereafter) or as an image (with weights) and execute a "semantic query". During semantic query processing, the system transforms the user's original term (or image query) to a set of equivalent queries, and internally executes all the equivalent queries before presenting the results to the user. A result processor accumulates the score sheets of each equivalent query and presents to the user a composite ranking that reflects a faithfuil representation of each equivalent query.

The victionary unit is responsible for taking a term (or image query) and finding the equivalent features (and weights), and handing them over to the query transformation unit. The query transformation unit is responsible in one aspect, for taking a user query and passing it to the victionary, and in another aspect, for controlling the query process by handing each equivalent feature (and weights) returned by the victionary to the query processor.

In one aspect of the present invention there is a visual query processing method, comprising the steps of providing a user query; applying the user query to a visual dictionary comprising a plurality of feature vectors so as to generate a set of query vectors; and applying the query vectors to an image database comprising a plurality of images so as to provide a list of similar images.

In another aspect of the present invention there is a visual query processing system, comprising a user query; a visual dictionary, comprising feature vectors representative of images, receiving the user query so as to select a set of feature vectors representative of the user query; a query transformer that transforms the selected set of feature vectors into a set of image queries; and a query processor receiving each separate query so as to index an image database comprising a plurality of images.

BRIEF DESCRIPTION OF THE DRAWINGS

FIGS. 10*a*, 10*b* and 10*c* are flowcharts of the query transformer process shown in FIG. 8.

DETAILED DESCRIPTION OF THE PREFERRED EMBODIMENT

The following detailed description of the preferred embodiment presents a description of certain specific embodiments of the present invention. However, the present invention can be embodied in a multitude of different ways as defined and covered by the claims. In this description, reference is made to the drawings wherein like parts are designated with like numerals throughout.

For convenience, the discussion of the preferred embodiment will be organized into the following principal sections: Introduction, Determination of Equivalent Features, Query Processing using the Victionary, Diversity Maximizing Function for the Result Processor, Architecture of the Victionary, Determining Equivalent Features within a Visual Dictionary, Creating Synonyms in the Victionary, and Extensibility of the Victionary.

I. Introduction

Figure 2:
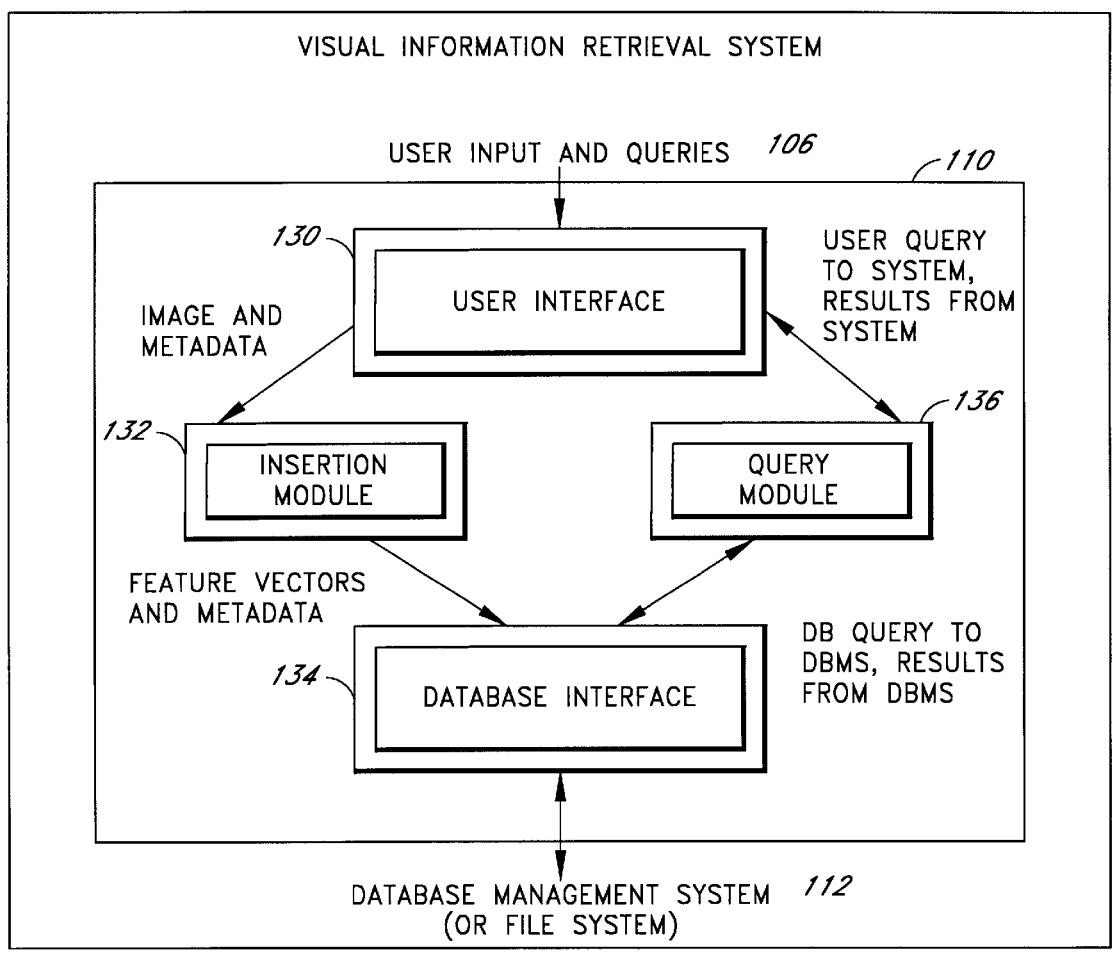
FIG. 2 is a block diagram of an expanded view of the visual information retrieval system shown in FIG. 1.
Figure 3:
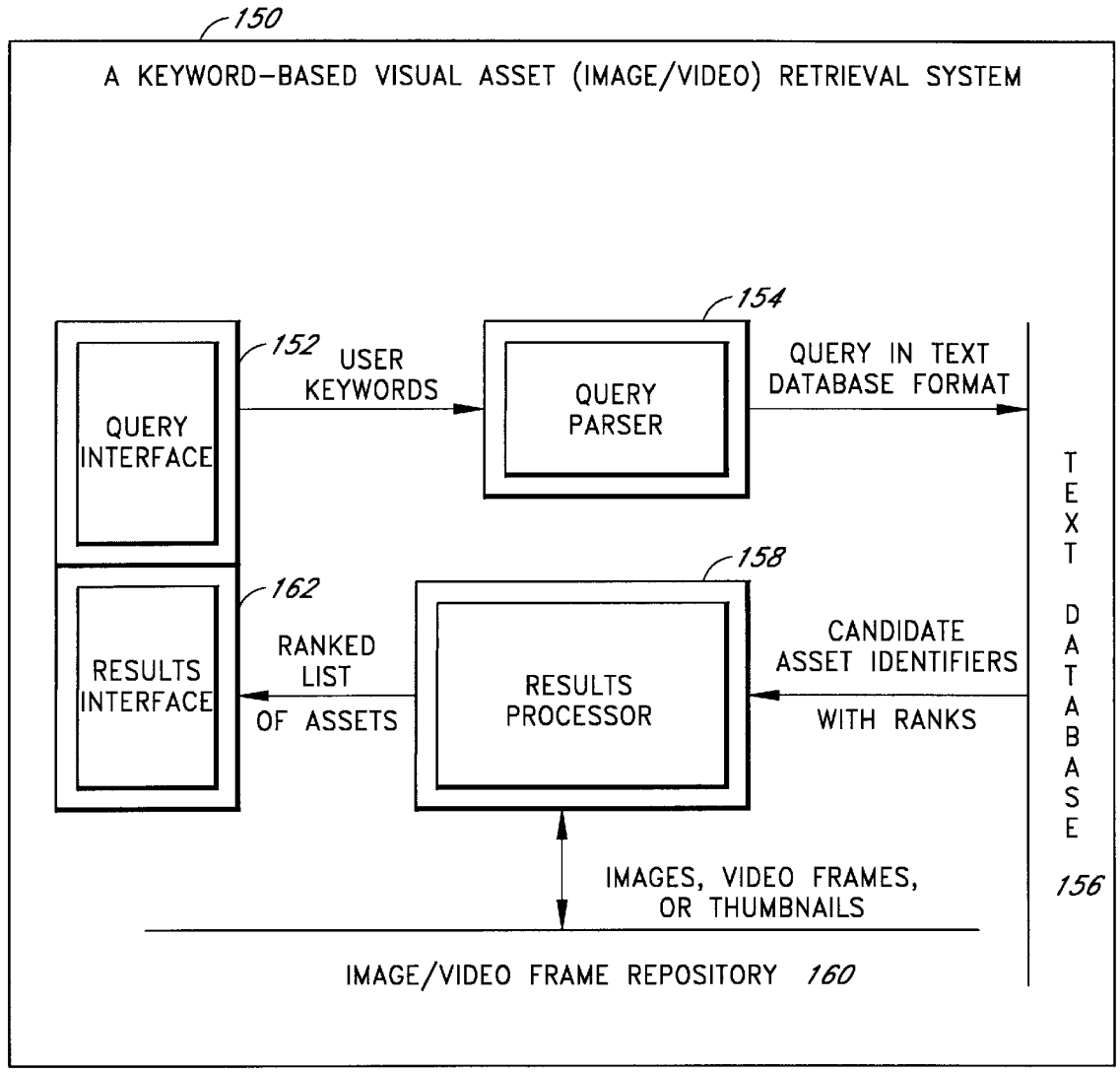
FIG. 3 is a data flow diagram of a typical keyword-based image retrieval system.
Figure 4:
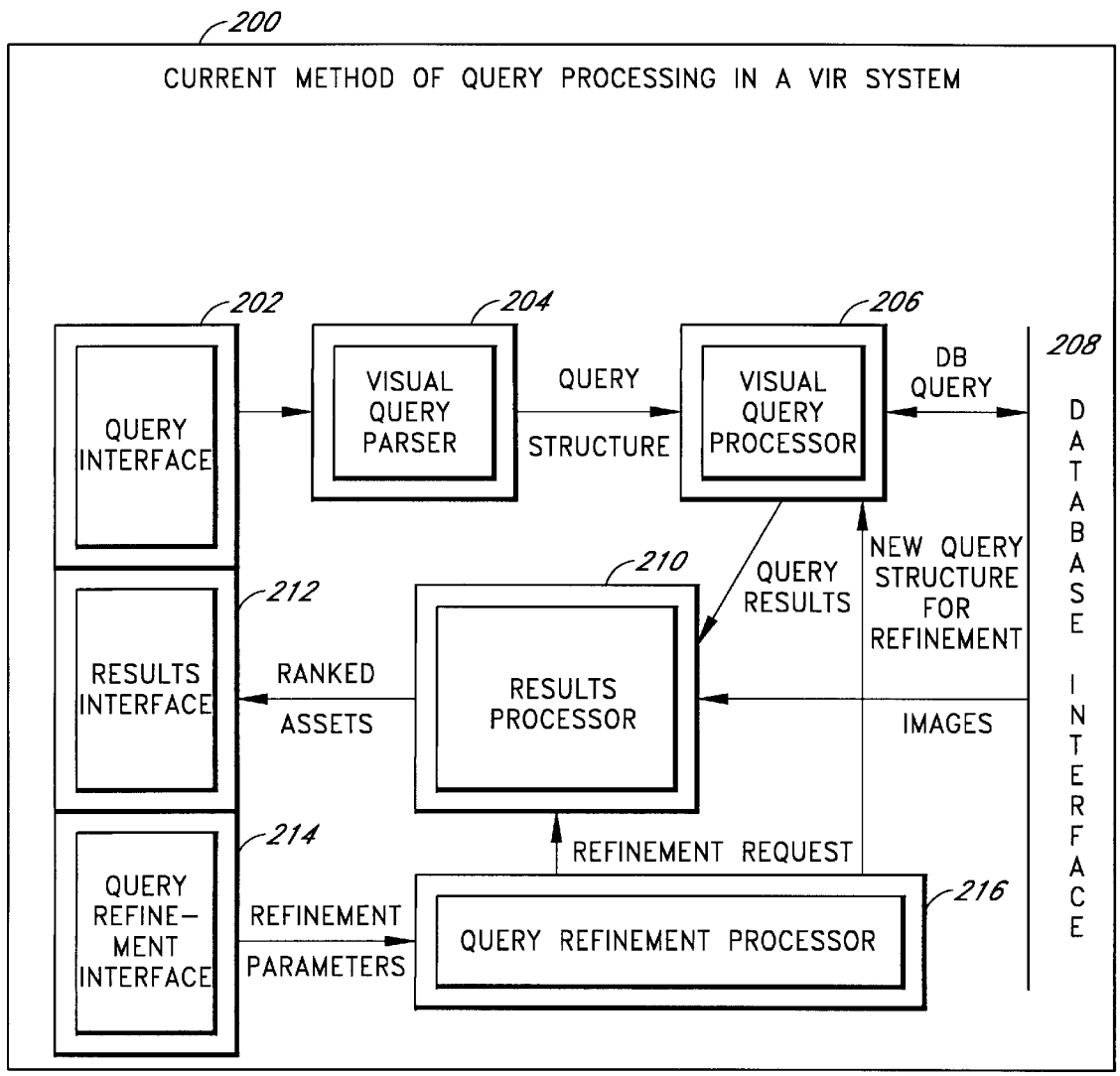
FIG. 4 is a data flow diagram of a typical visual information retrieval system.

In one preferred embodiment, the current invention restricts itself to the query processing aspects of a VIR system, such as shown in FIG. 2. The query processing aspects comprise a part of the User Interface 130, the Query Module 136, and the Database Interface 134, which communicates with the database management system (DBMS) 112 or file system. The DBMS (or file system) itself is assumed to be any one of a number of commercial systems such as available from Oracle, Sybase, Informix, or IBM.

There are six aspects of the current invention: The first aspect is the method of visual query processing with the help of the query transformer and the victionary. The method first takes a query term (or image query) from the user and parses it into an internal format. The parsed query is presented to the victionary to get back a set of equivalent features. The equivalent features are presented as separate queries to the query processor. The result of each equivalent query is accumulated and presented to the user by a diversity maximization method or function.

The second aspect is the architecture of the visual dictionary, which associates a text term (a concept) with a set of visual feature vectors for each "visual sense" of the term. Visual sense refers to a specific visual appearance that the term may take in an image. The architecture comprises a controller unit that interfaces with the query transformer and also manages the main control flow within the victionary, a concept manager which, along with the concept lexicon, identifies a user specified query term as a system-recognized concept, and an association manager which uses the nominal and definitional feature lexicons to find the nominal and definitional features (weights) of a system-recognized concept.

The third aspect of the invention is a method to use both nominative (noun-like) terms and qualifier (adjective-like) terms to characterize a visual sense. If the term "forest" has examples in the victionary depicting a green forest, a fall-color forest and an aerial view of a forest, and the user queries with a term "red forest", the system employs a method to use the qualifier "red" with the query. This will eliminate unnecessary visual senses while constructing the equivalent query. The method involves identification of the qualifier term, identification of a feature component that the qualifier term refers to ("color" in the previous example), creating an equivalent feature space query with the qualifier feature and executing a victionary query.

The fourth aspect of the invention is a method, which given a term (or image query), executes a victionary search and returns a set of equivalent features. In this method, the victionary first searches for the user's query term using a concept lexicon. Next, it searches for the visual senses of each recognized concept. Then it searches for the definitional features (and weights) for each visual sense, and returns them to the query transformation unit. If the user presents an image query, the method identifies the visual senses by finding the nominal features that overlap with the example feature vector (and weights), and then searching for the definitional features of those nominal features.

The fifth aspect of the invention is a method used by the result processor to accumulate the individual query result from each equivalent query into a single composite response. The purpose of the method is to ensure that the user is presented with the results in user-selectable batches such that for each batch, the diversity of result images is as broad as possible. In this method, the result processor first creates a matrix-like data structure, where each row of the matrix corresponds to one visual sense, and each element within a row represents the ranked result list for one definitional feature within that visual sense. Each ranked list is constrained to contain only those images whose feature vectors lies strictly within the scope of the corresponding definitional feature vector (i.e., within the ellipse in the feature space). For each list, n, the number of images in the list is computed. For each visual sense the total number of images N in it is also computed. The rows of the matrix structure are sorted in descending order of the number N. For each row, the elements are sorted in descending order of the number n. Results are presented in user-selectable batch sizes m, by first creating a row-wise quota obtained by allocating m among rows in proportion to the number N. For each row, images are selected from each list in a round-robin fashion until the quota of the row is exhausted.

The sixth aspect of the invention is that the architecture of the victionary-enriched query engine is open and extensible, so that one or more domain-specific victionary modules can be plugged into the system. The plug-in architecture of the victionary module is effected through an application programming interface (API) which every victionary module will conform to. In addition to the plug-in architecture of the module, the concept of the victionary can be extended to include a similar synonym definition and replacement mechanism for any other media such as audio and video.

II. Determination of Equivalent Features

Figure 5:
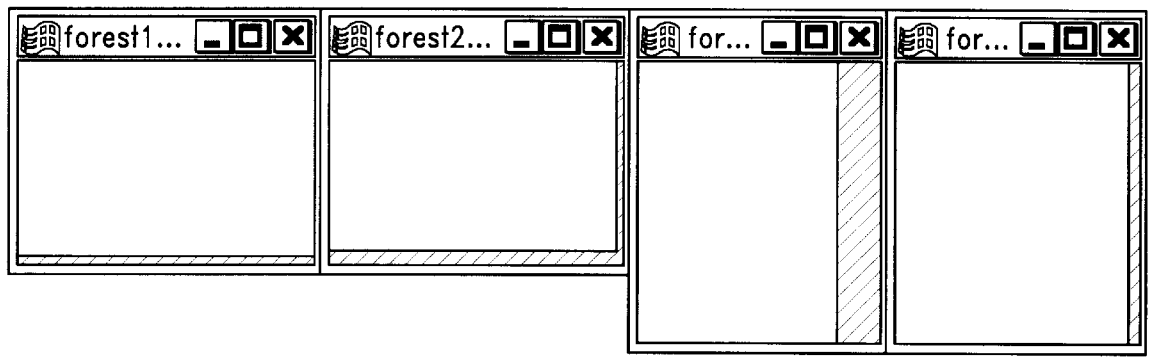
FIG. 5 is a diagram showing several images, which can serve as examples for the term forest.

The principle used to determine the equivalent feature for a term will now be discussed. The expression "visual sense" of a term is used to refer to a specific visual appearance that the term may take in a picture. For example, FIG. 5 shows several different appearances 240, 242, 244 and 246 of the term "forest". For each visual sense, there may be multiple feature vectors to account for the minor variations that can together represent the feature space corresponding to that visual sense. A feature vector (FV) describes a visual object. Vectors form a uniform base type for features representing image content. In a presently preferred embodiment, the primary data type in the VIR Engine is a (indexable) collection of feature vectors. A visual feature is any property of an image that can be computed using computer-vision or image-processing techniques. Examples of features are hue, saturation, and intensity histograms; texture measures such as edge density, randomness, periodicity, and orientation; and shape measures such as algebraic moments, turning angle histograms, and elongatedness. Some of these features are computed globally, i.e., over an entire image, and some are local, i.e., computed over a small region in the image.

Figure 6:
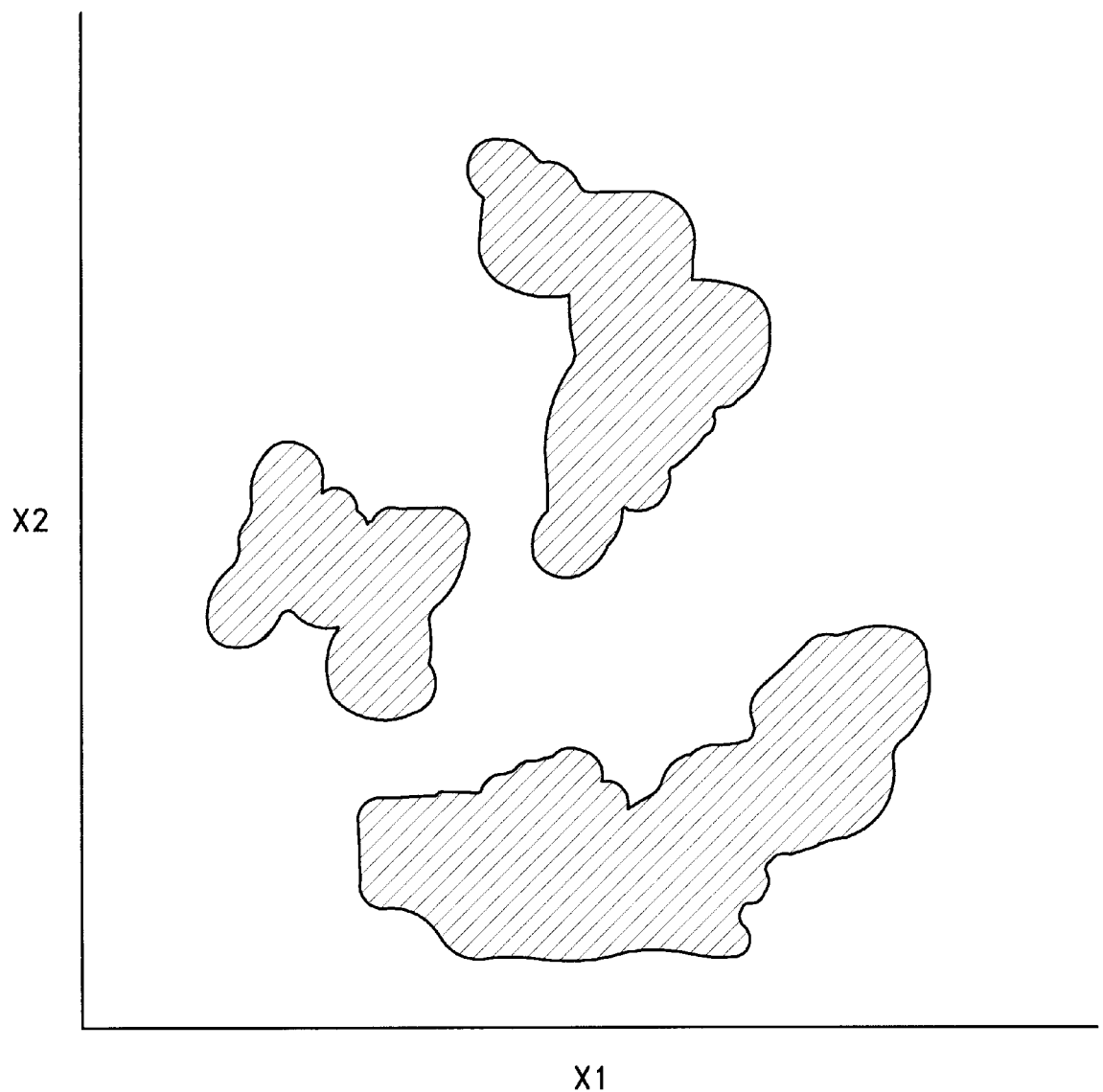
FIG. 6 is a diagram showing a hypothetical example of what a semantic concept may look like in a two-dimensional feature space.

FIG. 6 shows how the feature space 270 of an exemplary term may appear. Typically, the feature space is hyperspace, i.e., an n-dimensional space, where n>>1. For ease in discussion, however, a two-dimensional example is used herein. In this hypothetical two-dimensional feature space, there are three shaded regions 270, 274 and 276, each representing a different visual sense of the term.

Figure 7:
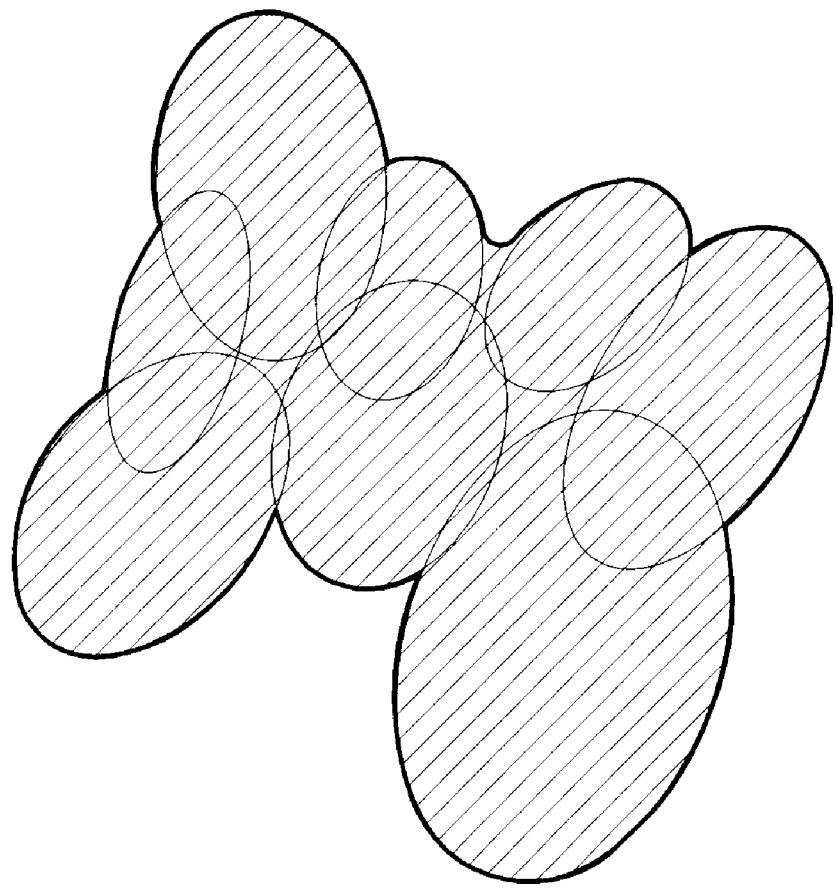
FIG. 7 is a diagram showing one of the regions of definition from FIG. 6 that needs several examples (represented by elliptical regions) to be covered.

FIG. 7 shows why multiple examples may be necessary to cover each visual sense. Typically, a feature vector can be considered to be a point in the feature space. When weights are specified with the feature vector, they represent ellipsoids around the feature point in the feature space. FIG. 7 shows a larger view of the leftmost feature region 274 from FIG. 6. Because of the shape of the region in feature space, it is impossible to construct an ellipse that will exactly cover this region. But as the figure shows, it is possible to construct a number of smaller overlapping ellipses 280–294 that together cover the region. These small ellipses can be considered to be feature vectors (called definitional features here) with their own weights. The ellipse is called the scope of the feature vector in this specification. Ideally, the ellipses satisfy three conditions—complete coverage, minimal overlap, and minimal number of ellipses. The coverage condition is more important than the other conditions. Additionally, it is possible to construct a large ellipse that covers the feature region (and some more areas), and use it as a "ball park" approximation of the feature region. The feature vector and weights corresponding to this large ellipse is called a nominal feature in this document. The victionary takes a term (or image query) as input and returns the corresponding definitional or nominal features.

III. Query Processing Using the Victionary

Figure 1:
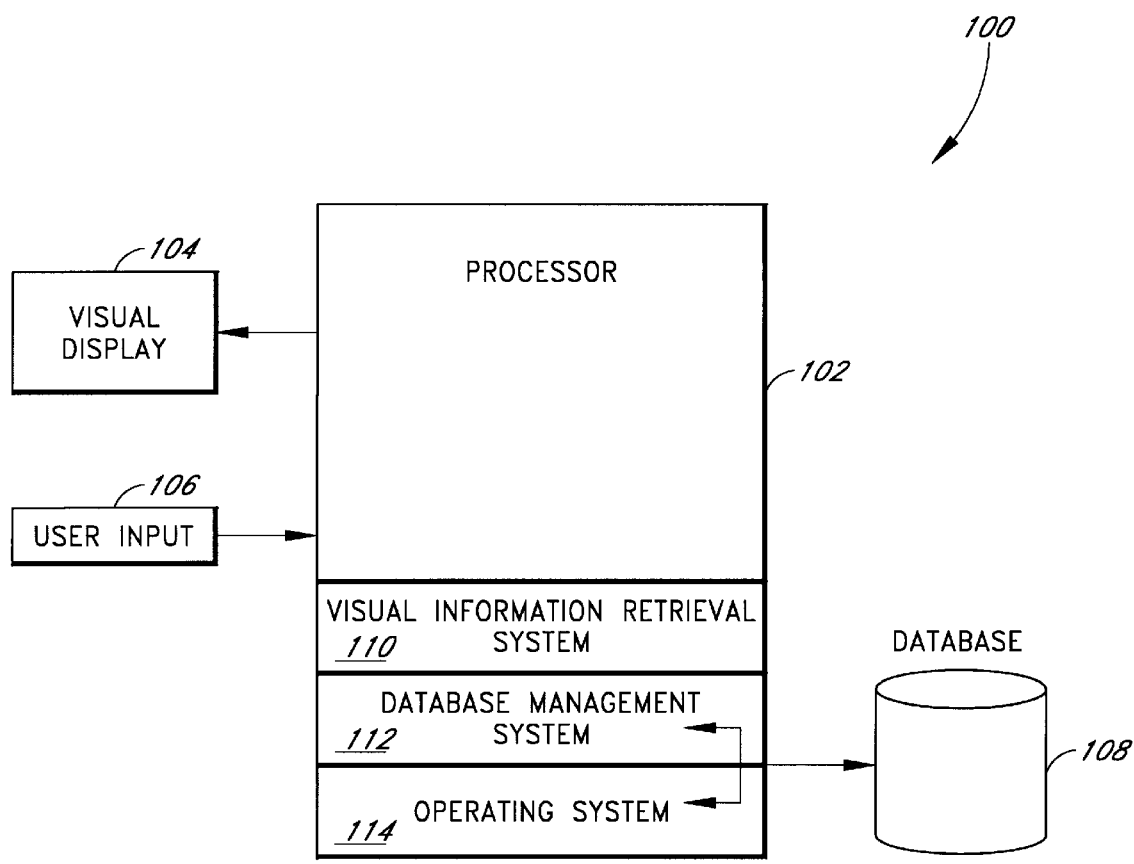
FIG. 1 is a block diagram of a computer system where the victionary-enriched visual information retrieval system of the present invention may reside.
Figure 8:
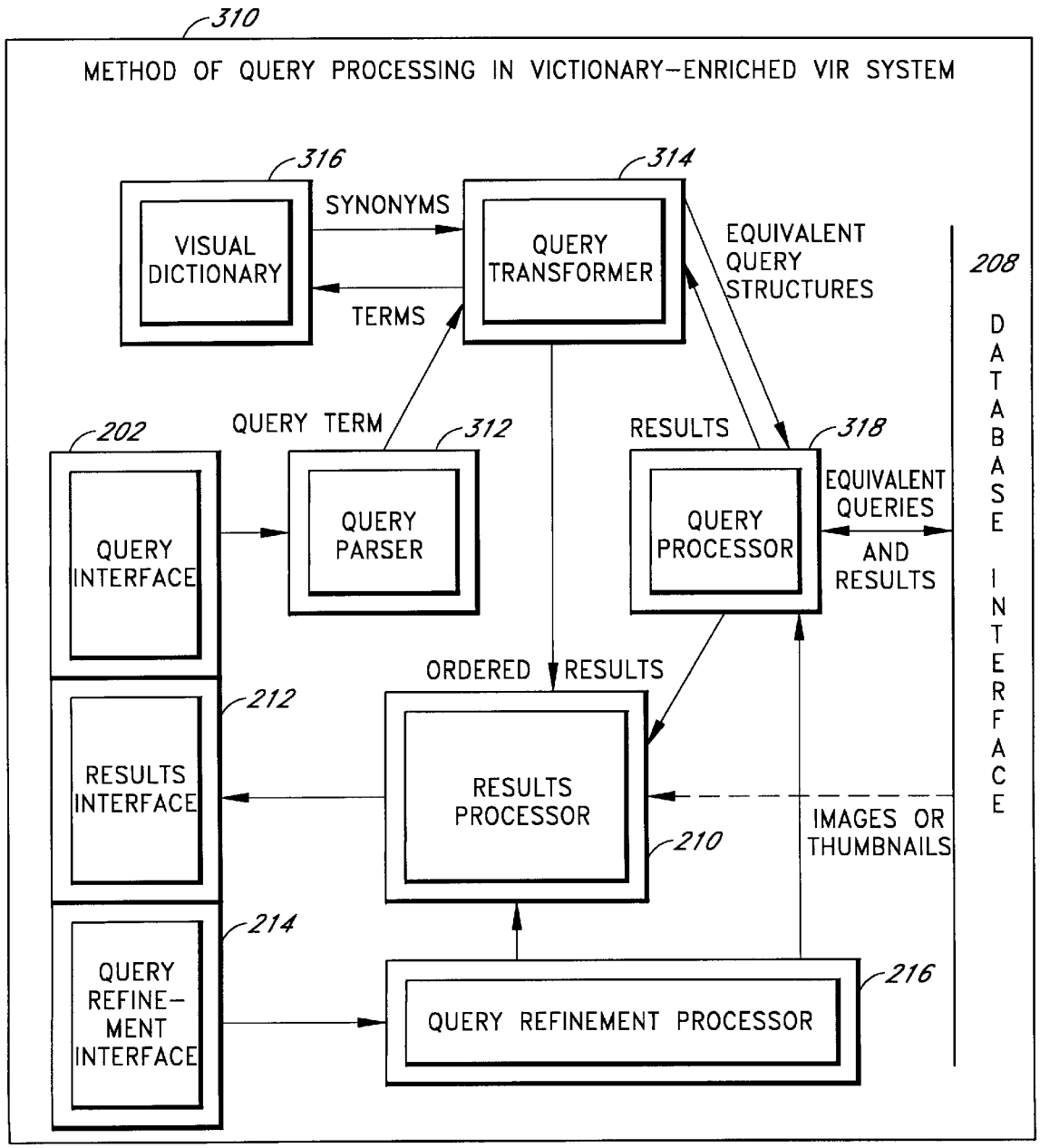
FIG. 8 is a data flow diagram of the victionary-enriched visual information retrieval system of the present invention shown in FIG. 2.

Referring to FIG. 8, the structure and function of a Victionary-enhanced VIR system 310 will be described. The database 112 (FIG. 1) stores, through database interface 208, a set of feature vectors of images that are stored therein. The user presents a query through an interface 202. The query preferably comprises an image or one or more textual terms. The query may include an optional set of weights which indicate the user's relative preferences of individual properties. A Query Parser 312 converts the user's query into an internal form (Query Structure) that is recognized by a Query Transformer 314. The fields and types of a record for the Query Structure are shown in Table 1 below:

TABLE 1

QUERY STRUCTURE

| Field | Type |
| --- | --- |
| QUERY-TYPE | IMAGE or TERM |
| BATCH-SIZE | Integer |
| NOMINAL-FLAG | Boolean |
| COMBINATOR | OR or AND |
| TERM-ARRAY | Array of String |
| QUERY-FEATURE | Feature Vector, represented as packed binary data |
| QUERY-WEIGHT | Array of Float |
| EQUIV | Array of Synonym Data Structure |

The Query Structure is representative of the query image or query term. The Query Transformer 314 passes the Query Structure to a Visual Dictionary (Victionary) 316, and receives an equivalent query synonym structure, comprising feature vectors, in return. The equivalent Query Structure is then sent to a Query Processor 318. The Query Processor 318 executes the equivalent queries by retrieving feature vectors from the database 112 (using the database interface 208), comparing them against the equivalent feature vectors and creating a ranked score sheet indicating the similarity of each retrieved image to the query image or query term. The Query Processor 318 sends the ranked results back to the Query Transformer 314.

The Query Transformer 314 then sends the ranked results along with portions of the Query Structure to the Result Processor 210. The Result Processor 210 uses the ordered results and the Query Structure, including user defined weights if the query utilized an image, to compute a final ranked list. Images (or their thumbnail representations) corresponding to the ranked list are preferably obtained through the Query Processor 318 from the database interface 208 and presented to the user through the Results Interface 212. The Result Processor 210 may optionally obtain the images (or their thumbnail representations) directly from the database interface 208.

The VIR system 310 may include the Query Refinement Interface 214 that sends refinement parameters based on user input to the query refinement processor 216 for modification of a query. The Query Refinement Processor 216 may send a new Query Structure for refinement of the database query to the Query Processor 318 to produce a new set of query results and/or may send a refinement request to the Result Processor 210 to refine the prior set of query results. Query refinement preferably comprises weight manipulation, although other types of query refinement are envisioned.

Referring to FIGS. 9–12, the victionary-enhanced VIR system 310 depicted in FIG. 8 executes the following steps during query processing. The specific steps performed within the Victionary unit 316 and within the Result Processor 210 are detailed separately below.

Figure 9:
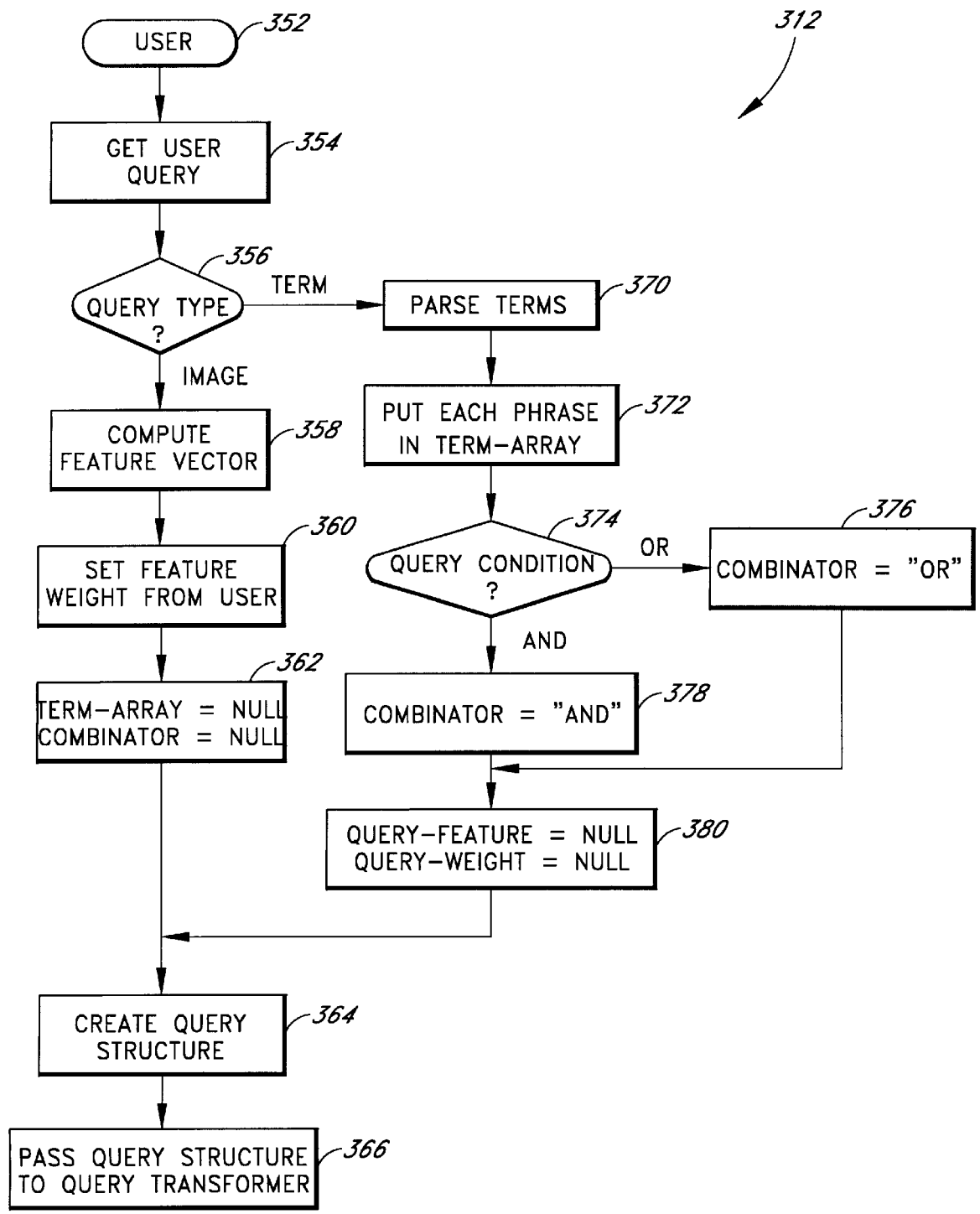
FIG. 9 is a flowchart of the query parser process shown in FIG. 8.

Referring now to FIG. 9, the Query Parser process 312, previously shown in FIG. 8, will be described. Beginning at state 352, a user of the victionary-enhanced VIR system 310 provides a user query. Moving to state 312, process 312 gets the user query through a specified Graphical User Interface (GUI) operation, such as clicking a button. The process 312 also obtains a BATCH-SIZE of the number of result images desired to be seen by the user at a time. The BATCH-SIZE is used to present a desired number of images at one time on the visual display. Continuing to a decision state 356, process 312 determines if the user query is a term or an image query. If query is an image, process 312 sets a variable QUERY-TYPE=IMAGE, and proceeds to state 358. At state 358, process 312 uses a VIR engine to compute the feature vector of the image query and store it in a vector-type variable QUERY-FEATURE. Computation of feature vectors is described in Applicant's U.S. patent application Ser. No. 08/829,791, filed Mar. 28, 1997, for "SIMILARITY ENGINE FOR CONTENT-BASED RETRIEVAL OF OBJECTS". Proceeding to state 360, process 312 places the user-supplied weights from the GUI in a vector-type variable QUERY-WEIGHT. The weights are preferably part of the user query for an image type query. Continuing at state 362, process 312 sets a variable array TERM-ARRAY=NULL, and a variable COMBINATOR=NULL. The variable COMBINATOR is used to designate how terms are to be combined in a term type query. Moving to state 364, process 312 creates a variable QUERY-STRUCTURE object using the previously defined variables QUERY-TYPE, BATCH-SIZE, QUERY-FEATURE, NOMINAL-FLAG, QUERY-WEIGHT, TERM-ARRAY, and COMBINATOR. An additional field EQUIV of QUERY-STRUCTURE is unfilled at this time. Normally, NOMINAL FLAG is clear (OFF), but application logic, such as during the Query Transformer, may set the flag. If set (ON), NOMINAL FLAG only retrieves a nominal vector (described hereinbelow). Process 312 completes at state 366 by passing the QUERY-STRUCTURE created at state 364 to the Query Transformer 314 (FIG. 8).

Returning to decision state 356, if the query type is term, process 312 sets the variable QUERY-TYPE=TERM, and advances to state 370. At state 370, process 312 preferably uses a standard text parser, such as described by Allen I. Holub, Compiler design in C, Englewood Cliffs, N.J., Prentice Hall, ©1990, to isolate individual phrases of the query. Continuing at state 372, process 312 places each phrase in a row of the array called TERM-ARRAY. Moving to a decision state 374, process 312 determines the type of a user-supplied combination condition, i.e., AND or OR. The variable COMBINATOR is set to a value of "OR" at state 376 if the combination condition is OR, or is set to a value of "AND" at state 378 if the combination condition is AND. Continuing at state 380, process 312 sets the variable QUERY-FEATURE=NULL, and the variable QUERY-WEIGHT=NULL. Proceeding to state 364, process 312 creates the variable QUERY-STRUCTURE object with QUERY-TYPE, BATCH-SIZE, NOMINAL-FLAG, COMBINATOR, TERM-ARRAY, QUERY-FEATURE, and QUERY-WEIGHT.

Figure 10A:
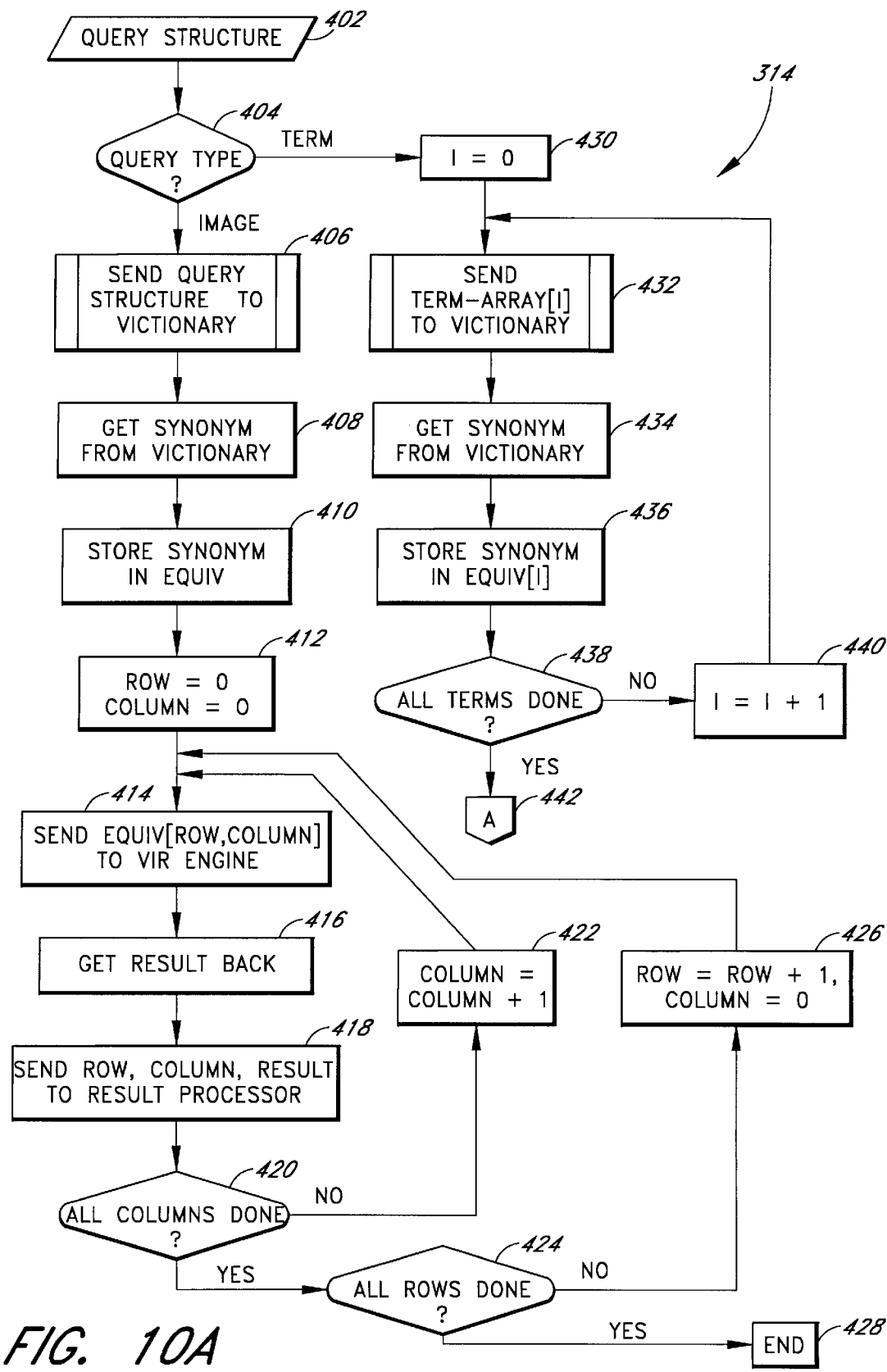
Figure 10C:
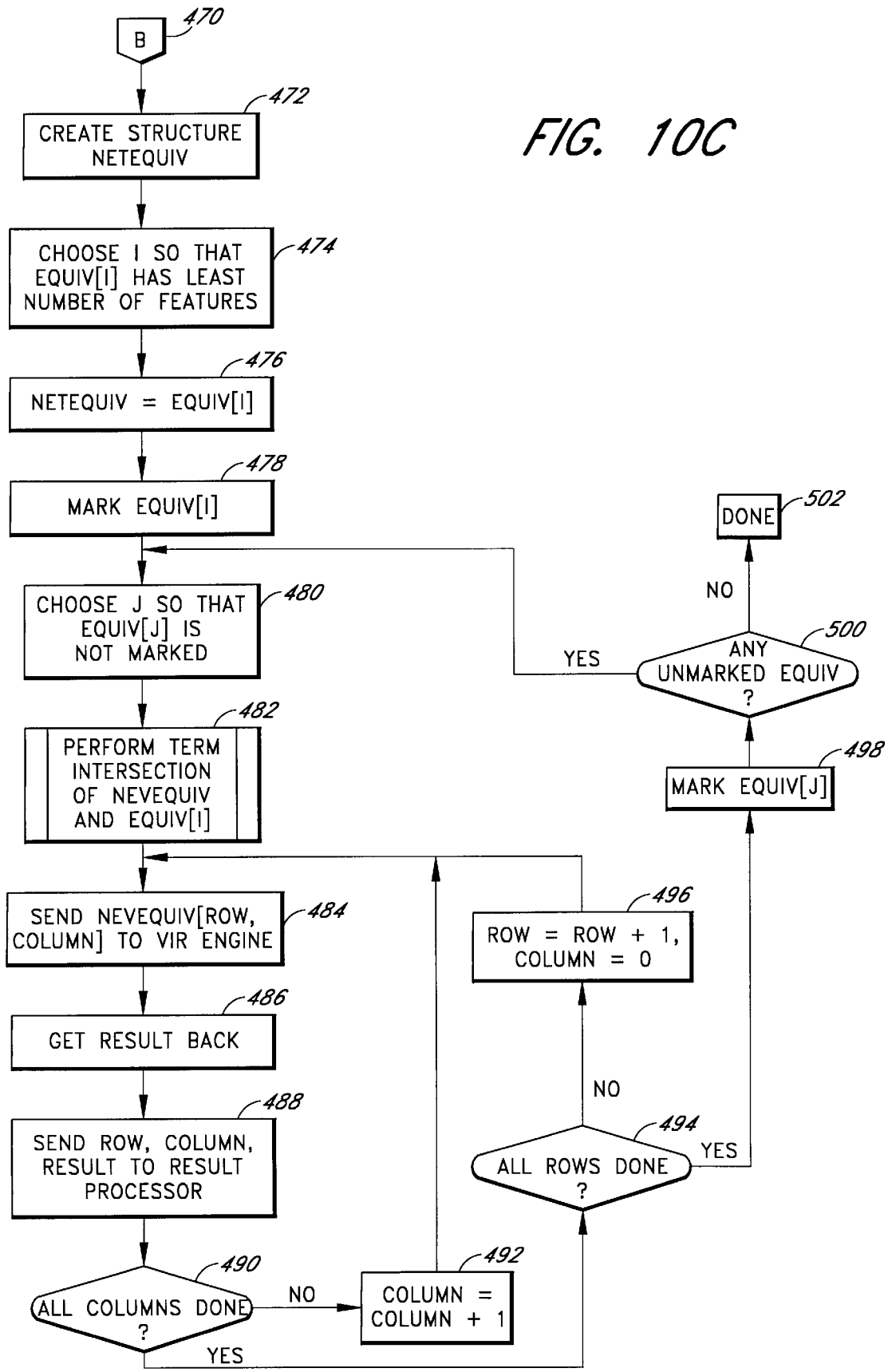

Referring now to FIG. 10a, 10b and 10c, the Query Transformer process 314, previously shown in FIG. 8, will be described. Beginning at state 402, process 314 receives the QUERY-STRUCTURE generated by the Query Parser 312. Moving to a decision state 404, process 314 determines the type of query by examining the variable QUERY-TYPE. If the type of query is Image, process 314 continues at state 406 wherein the QUERY-STRUCTURE is passed to the Victionary 316 (FIG. 8). The structure and operation of the Victionary 316 will be described in conjunction with FIGS. 14–16 below. Moving to state 408, process 314 receives an equivalence structure SYNONYM from the Victionary (see details hereinbelow). Advancing to state 410, process 314 stores the SYNONYM structure in array variable EQUIV (part of QUERY-STRUCTURE).

Continuing at state 412, process 314 initializes a variable ROW to a value of zero and a variable COLUMN to a value of zero. Moving to state 414, process 314 sends the feature vector at EQUIV [ROW,COLUMN] to the Query Processor 318 to execute VIR query through database interface 208. Process 314 receives a ranked result of the query back from the Query Processor 318 at state 416. Continuing at state 418, process 314 passes ROW, COLUMN, RESULT and the variables QUERY-TYPE, QUERY-WEIGHT, and BATCH-SIZE to the Result Processor 210. The Result Processor will be further described in conjunction with FIG. 12. Proceeding to a decision state 420, process 314 determines if all the columns in the current row of EQUIV have been processed. If not, process 314 moves to state 422, increments the value of variable COLUMN by one, and moves back to state 414 to send the next feature vector at EQUIV [ROW,COLUMN] to the Query Processor 318. If all the columns in the current row of EQUIV have been processed, as determined at state 420, process 314 advances to a decision state 424 and determines if all the rows in EQUIV have been processed. If not, process 314 moves to state 426, increments the value of variable ROW by one, reinitializes the value of COLUMN to zero, and moves back to state 414 to send the next feature vector at EQUIV [ROW,COLUMN] to the Query Processor 318. If all the rows of EQUIV have been processed, as determined at state 424, the Query Transformer process 314 completes at an end state 428.

Returning to decision state 404, if the type of query is determined to be Term, process 314 proceeds to state 430 wherein a variable I, used as an array index, is initialized to zero. Continuing at state 432, process 432 passes the term at TERM-ARRAY [I] to the Victionary 316 (FIG. 8). The structure and operation of the Victionary 316 will be described in conjunction with FIGS. 14–16 below. Moving to state 434, process 314 receives the equivalence structure SYNONYM from the Victionary 316. Advancing to state 436, process 314 stores the SYNONYM structure in variable EQUIV [I]. Proceeding to a decision state 438, process 314 determines if all terms in array TERM-ARRAY have processed. If not, process 314 increments the value if I by one and moves back to state 432 to send the next term to the Victionary 316. When all the terms in array TERM-ARRAY have processed, as determined at decision state 438, process 314 moves a decision state 444 (FIG. 10b) through off-page connector A 442.

At decision state 444, process 314 determines the value of variable COMBINATOR. Variable COMBINATOR was previously set at state 376 or 378 of the Query Parser process 312 (FIG. 9). If the value of COMBINATOR is OR, process 314 proceeds to state 446. At state 446, process 314 initializes a variable T to zero, variable ROW to a value of zero, variable COLUMN to a value of zero, and variable TERMROW to a value of zero. The variable T is used to index the current term of array EQUIV. Moving to state 448, process 314 chooses the feature vector at [ROW, COLUMN] of array EQUIV [T]. Proceeding to state 450, process 314 sends the feature vector selected at state 448 to the Query Processor 318 to execute a VIR query through database interface 208. Process 314 receives a ranked result of the query back from the Query Processor at state 452.

Continuing at state 454, process 314 passes TERMROW, COLUMN, RESULT and the variables QUERY-TYPE and BATCH-SIZE to the Result Processor 210. Proceeding to a decision state 456, process 314 determines if all the columns in the current row of EQUIV [T] have been processed. If not, process 314 moves to state 458, increments the value of variable column by one, and moves back to state 448 to select the next feature vector of EQUIV [T]. If all the columns in the current row of EQUIV [T] have been processed, as determined at state 456, process 314 advances to a decision state 460 and determines if all the rows of EQUIV [T] have been processed. If not, process 314 moves to state 462, increments the value of variable ROW by one, reinitializes variable COLUMN to zero, increments the value of TERMROW by one, and moves back to state 448 as previously described. If all the rows of EQUIV [T] have been processed, as determined at state 460, process 314 proceeds to a decision state 464 and determines if all terms T of EQUIV have been processed. If not, process 314 moves to state 466, reinitializes the variable ROW to zero, reinitializes the variable COLUMN to zero increments the value of T by one, and moves to state 448 as previously described. However, if all terms of EQUIV have been processed, as determined at state 464, the Query Transformer process 314 completes at an end state 468.

If there is a single term in the user's query, the variable COMBINATOR will be an OR. In this situation, there will be a single ROW and a single term T in EQUIV, so both decision states 460 and 464 will evaluate to the Yes branch.

Returning to decision state 444, if the value of COMBINATOR is determined to be AND, process 314 proceeds to state 472 (FIG. 10C) through off page connector B 470. At state 472, process 314 creates a structure NETEQUIV. NETEQUIV is an array variable that is the same as array EQUIV but is initially empty. When the value of COMBINATOR is AND, NETEQUIV is used to store the intersection of terms in EQUIV that are in the user query. Proceeding to state 474, process 314 chooses index I such that EQUIV [I] identifies the term of EQUIV having the least number of equivalent feature vectors. This is to reduce processing time, because the result of intersecting sets of equivalent feature vectors will not have more members than the number of equivalent feature vectors of the smaller set. Advancing to state 476, process 314 sets NETEQUIV equal to EQUIV [I]. Continuing at state 478, process 314 marks EQUIV [I] to note which term in EQUIV is being processed so as not to repeat the same term at a later time. Proceeding to state 480, process 314 chooses index J such that EQUIV [J] is not marked. Moving to a function 482, process 314 performs a term intersection of NETEQUIV and EQUIV [I]. The tenn intersection function 482 is described in conjunction with FIG. 11. Continuing at state 484, process 314 sends NETEQUIV [ROW, COLUMN] to the Query Processor 318 to execute a VIR query through the database interface 208. Process 314 receives a ranked result of the query back from the Query Processor 318 at state 486.

Continuing at state 488, process 314 passes ROW, COLUMN, RESULT, and the variables QUERY-TYPE and BATCH-SIZE to the Result Processor 210. Proceeding to a decision state 490, process 314 determines if all the columns in the current row of NETEQUIV have been processed. If not, process 314 moves to state 492, increments the value of variable COLUMN by one, and moves back to state 484 to send the next feature vector in NETEQUIV to the Query Processor 318. If all the columns in the current row of NETEQUIV have been processed, as determined at state 490, process 314 advances to a decision state 494 and determines if all the rows in NETEQUIV have been processed. If not, process 314 moves to state 496, increments the value of variable ROW by one, reinitializes the variable COLUMN to a value of zero, and moves back to state 484 as previously described. If all the rows of NETEQUIV have been processed, as determined at state 494, process 314 advances to state 498. At state 498, process 314 marks the term at EQUIV [J]. Moving to a decision state 500, process 314 determines if there are any unmarked terms in EQUIV, i.e., more feature vectors to be processed. If so, process 314 moves back to state 480 to choose a new index value J as previously described. However, if there are no unmarked terms in EQUIV, as determined at decision state 500, the Query Transformer process 314 completes at a done state 502.

Figure 11:
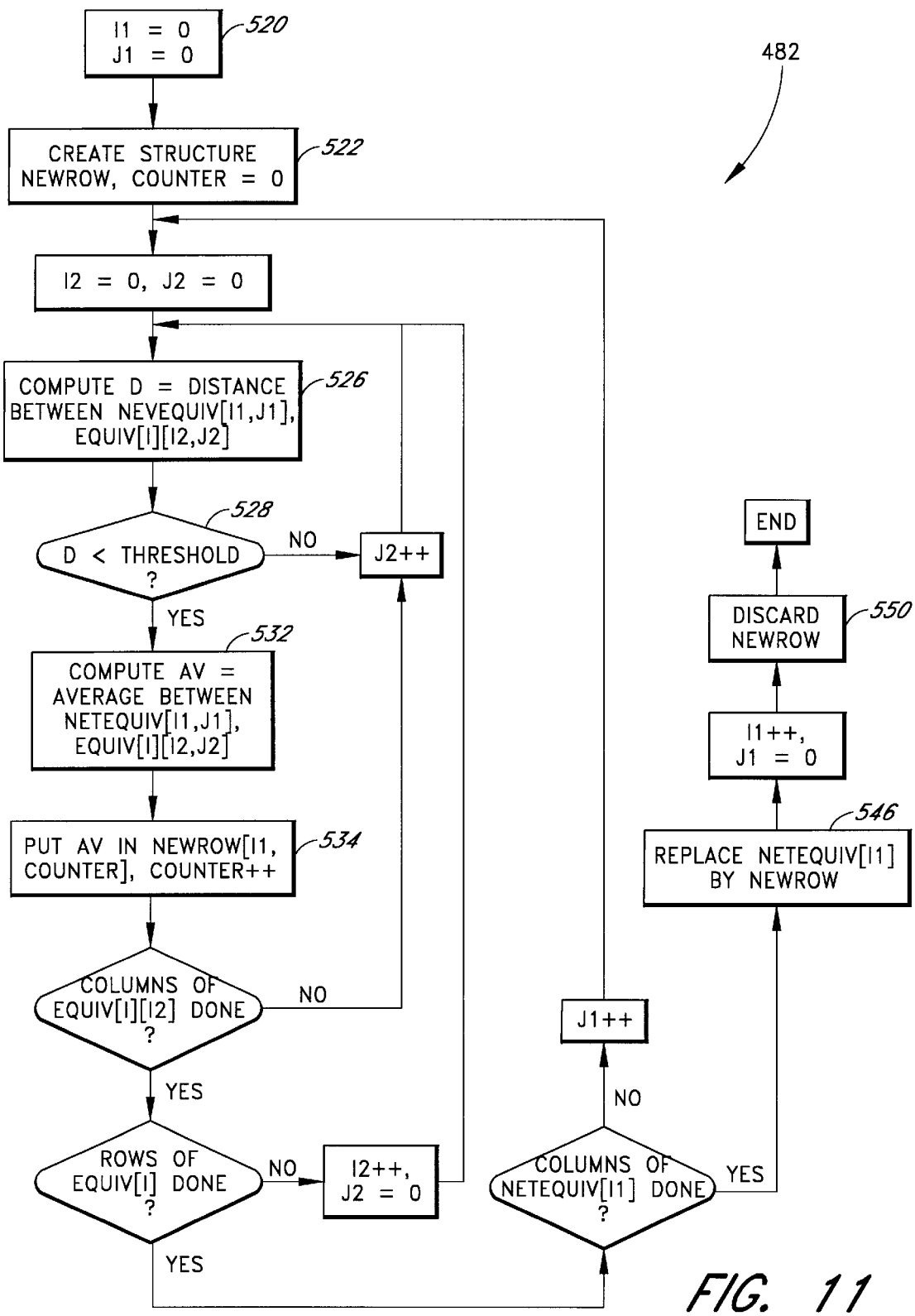
FIG. 11 is a flowchart of the term intersection function shown in FIG. 10*c*.

Referring now to FIG. 11, the Term Intersection function 482, previously defined in FIG. 10c will now be described. This function 482 is used by the Query Transformer process 314 when the value of COMBINATOR is AND. Function 482 begins at state 522 by generating a new array structure called NEWROW. The function 482 then accesses the feature vector at row I1 in NETEQUIV and column element J1 of row I1 in array NETEQUIV. Function 482 also accesses the feature vector at row I2 and column element J2 of row I2 of the term at EQUIV [I]. Next, at state 526, function 482 computes a distance D between the accessed feature vector of EQUIV [I] and the accessed feature vector of NETEQUIV. If the distance is less than a designer-defined threshold T, as determined at a decision state 526, function 482 computes the weighted average of the accessed feature vector of EQUIV [I] and the accessed feature vector of NETEQUIV at state 532, and places the computed average into the structure NEWROW at state 534. Next, function 482 loops over all column elements of row I1 of NETEQUIV and then replaces row I1 of NETEQUIV with NEWROW at state 546. Finally, function 482 loops over all the rows of NETEQUIV and deletes structure NEWROW at state 550 when all the rows of NETEQUIV have been processed.

Figure 12:
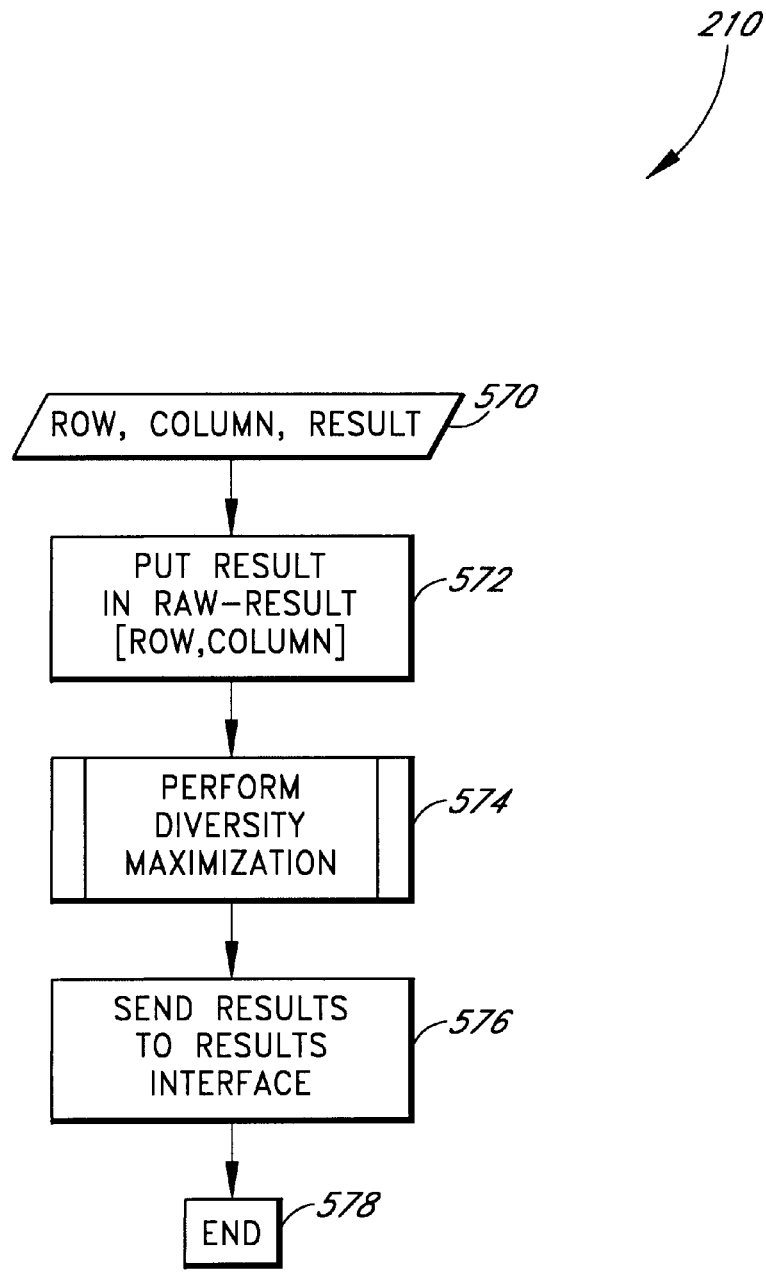
FIG. 12 is a flowchart of the result processor process shown in FIG. 8.

Referring to FIG. 12, the Result Processor process 210, previously shown in FIG. 8, will now be described. Beginning at a state 570, process 210 receives ROW, COLUMN, and RESULT from the Query Transformer 314, along with the variables QUERY-TYPE, QUERY-WEIGHT (for an image query), and BATCH-SIZE. Proceeding to state 572, process 210 stores RESULT into the [ROW,COLUMN] position of a RAW-RESULT matrix. Moving to a Diversity Maximization function 574, process 210 processes the RAW-RESULT matrix to produce a BATCH-SIZE number of ranked results to be displayed to the user. Function 574 ensures that the user is presented with the results in user-selectable batches such that for each batch, the diversity of result images is as broad as possible. The Diversity Maximization function 574 rearranges the results of the user query to show a proportion of the results corresponding to each equivalent feature vector. For example, if one user query has five equivalent feature vector queries, the results displayed to the user will have a portion from each equivalent feature vector query as determined by function 574. At the completion of the Diversity Maximization function 574, process 210 moves to state 576 and sends the ranked results of function 574 to the Results Interface 212 (FIG. 8). The Result Processor process 210 completes at an end state 578.

IV. Diversity Maximizing Function for the Result Processor

Figure 13A:
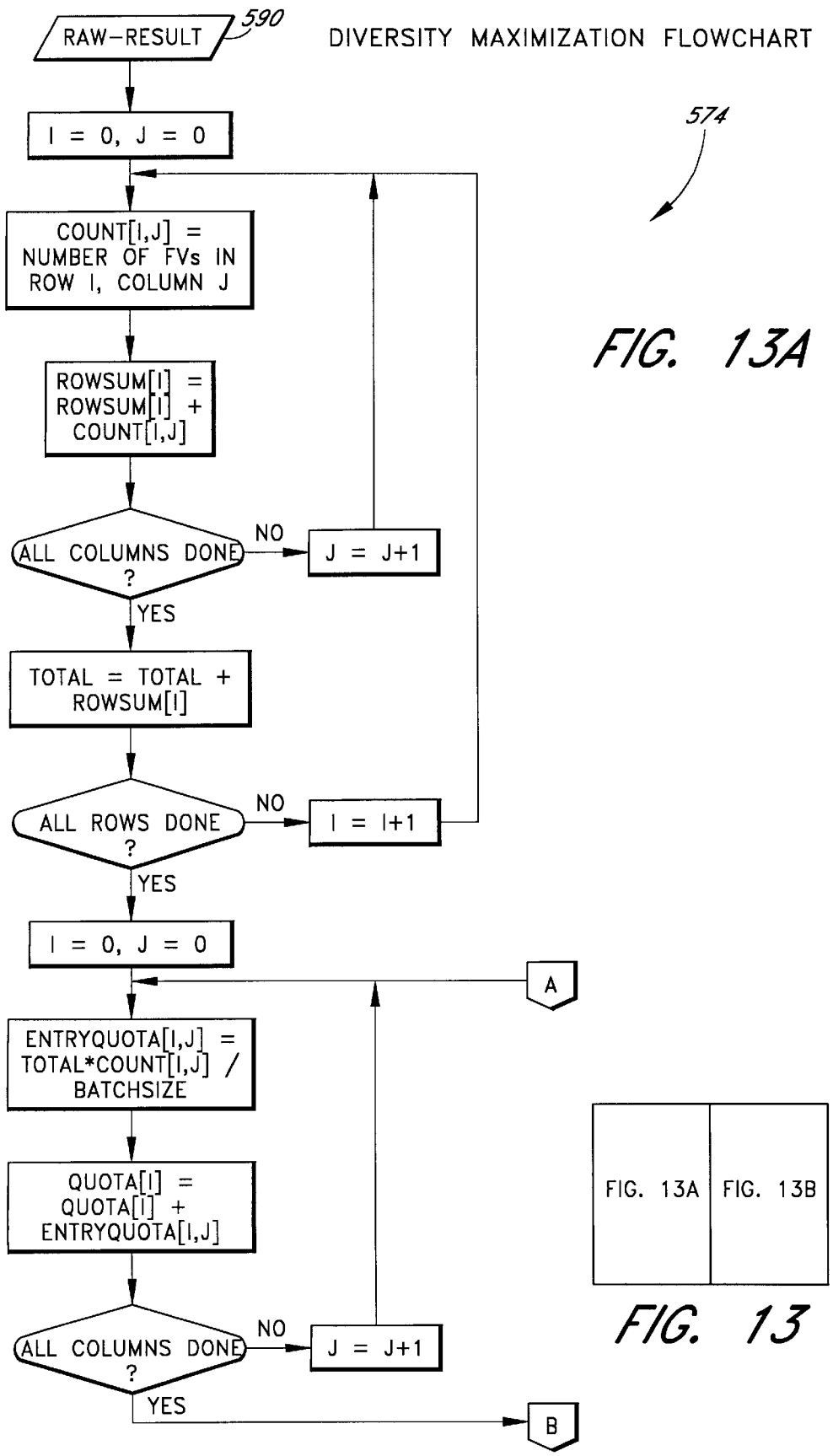
FIG. 13 is a flowchart of the diversity maximization function shown in FIG. 12.
Figure 13:
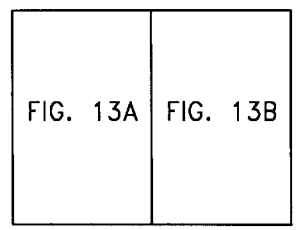
Figure 13B:
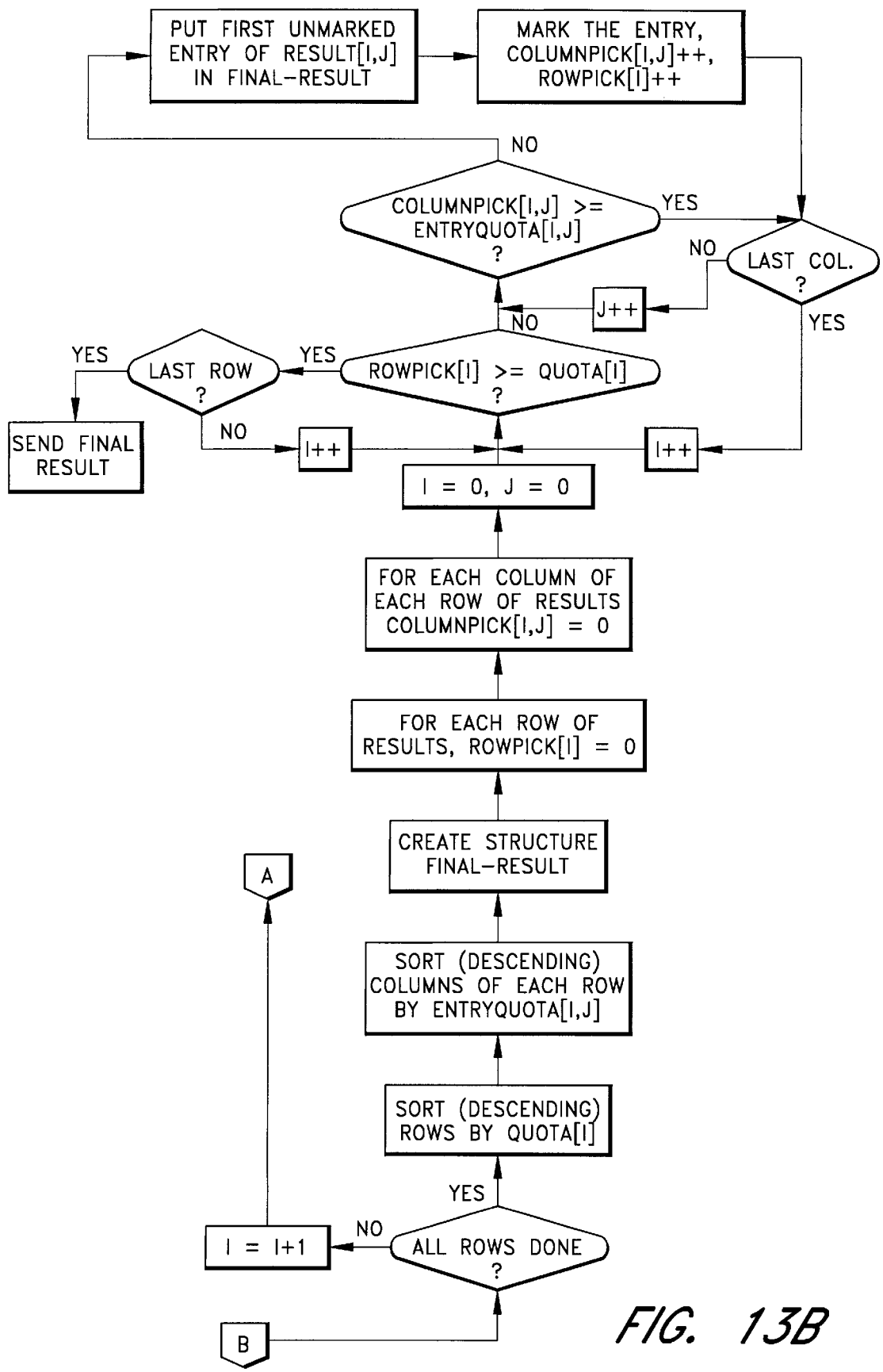
Figure 17:
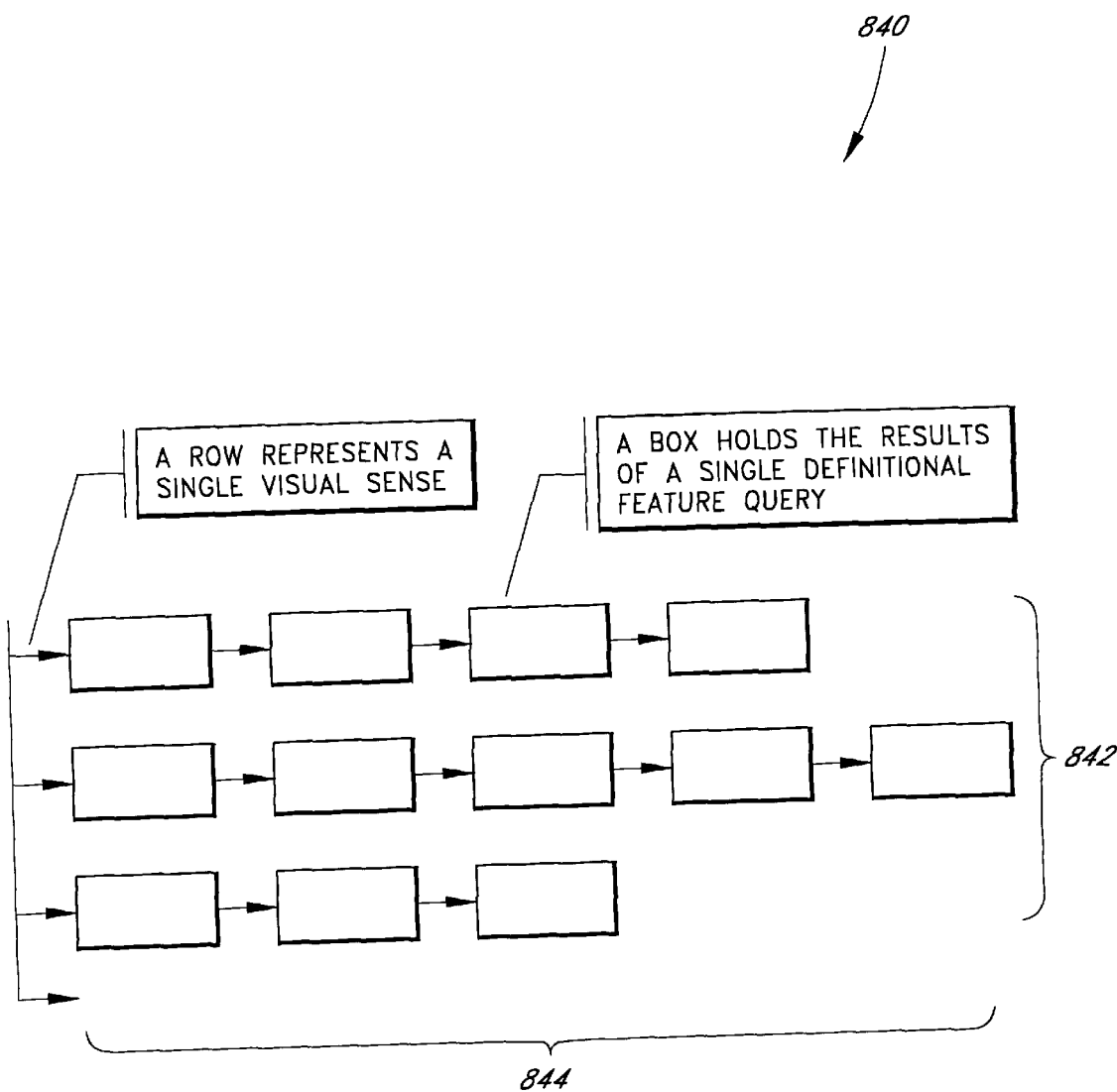
FIG. 17 is a diagram showing a SYNONYM data structure, wherein the rows represent different visual senses and the columns represent the nominal or definitional features associated with each visual sense.

Referring to FIG. 13, the Diversity Maximization function 574 defined in FIG. 12 of the query processing process will now be described. The input to the flnction 574 is the RAW-RESULTS matrix 590 corresponding to the SYN-ONYM structure received by the Query Transformer 314 from the Victionary 316. An exemplary SYNONYM structure 840 is shown in FIG. 17. As previously discussed, the "visual sense" of a term is used to refer to a specific visual appearance that the term may take in a picture. The rows 842 of the matrix 840 correspond to individual visual senses and the columns 844 correspond to the variety of visual catego-ries within each visual sense. For example, if a visual sense (row) is "cloudy sky", visual categories may include red clouds, white clouds, dark clouds, and so forth. Each entry of the RAW-RESULTS matrix is a ranked list of results returned from the Query Transformer 314. The steps herein are enumerated for a single batch (determined by BATCH-SIZE) and are repeated for every batch of results that the user wishes to view. A variable QUOTA is used to indicate how many images to display per visual sense (row) of the matrix, and a variable ENTRYQUOTA is used to indicate how many images to display per visual category (column) of the matrix. Each step below corresponds to one or more states in FIG. 13.

Step 1: (a) For each row of the RAW-RESULTS matrix 590
 (b) For each column entry
 (c) compute COUNT(I,J) = the number of elements in the ranked list
Step 2: (a) For each row of the RAW-RESULTS matrix
 (b) compute ROWSUM(I) = sum of COUNT(I,J) over its column elements
Step 3: compute TOTAL = sum of ROWSUM(I) over all rows
Step 4: For each row of the RAW-RESULTS matrix
 (a) compute QUOTA(I) = TOTAL * ROWSUM(I) / BATCH-SIZE
Step 5: Reorder the rows of the RAW-RESULTS matrix such that rows are sorted in decreasing order of QUOTA (I)
Step 6: For each row of the RAW-RESULTS matrix
 (a) compute ENTRYQUOTA(I,J) = QUOTA(I) * COUNT(I,J) / ROWSUM(I)
 (b) Reorder column entries of the row such that columns are sorted in decreasing order of ENTRYQUOTA(I,J)
Step 7: (a) Create array FINAL-RESULT of BATCH-SIZE
 (b) For each row I of the reorganized RAW-RESULTS matrix
 (c) set variable ROWPICK(I) = 0
 (d) For each column entry J
 (e) set variable COLUMNPICK(I,J) = 0
Step 8: (a) For each row I of the reorganized RAW-RESULTS matrix
 (b) unless ROWPICK (I) >= ROWSUM(I)
 (c) For each column entry J
 (d) unless COLUMNPICK (I,J) >= ENTRYQUOTA(I,J)
  1. pick the first unmarked result from the ranked list of column entry J and place in FINAL-RESULT
  2. mark the picked result
  3. increment COLUMNPICK(I,J)
  4. increment ROWPICK(I)
 (e) if COLUMNPICK (I,J) >= ENTRYQUOTA(I,J) go to next column
 (f) if ROWPICK (I) >= ROWSUM(I) go to next row
Step 9 Return FINAL-RESULT to calling routine

V. Architecture of the Victionary

Figure 14:
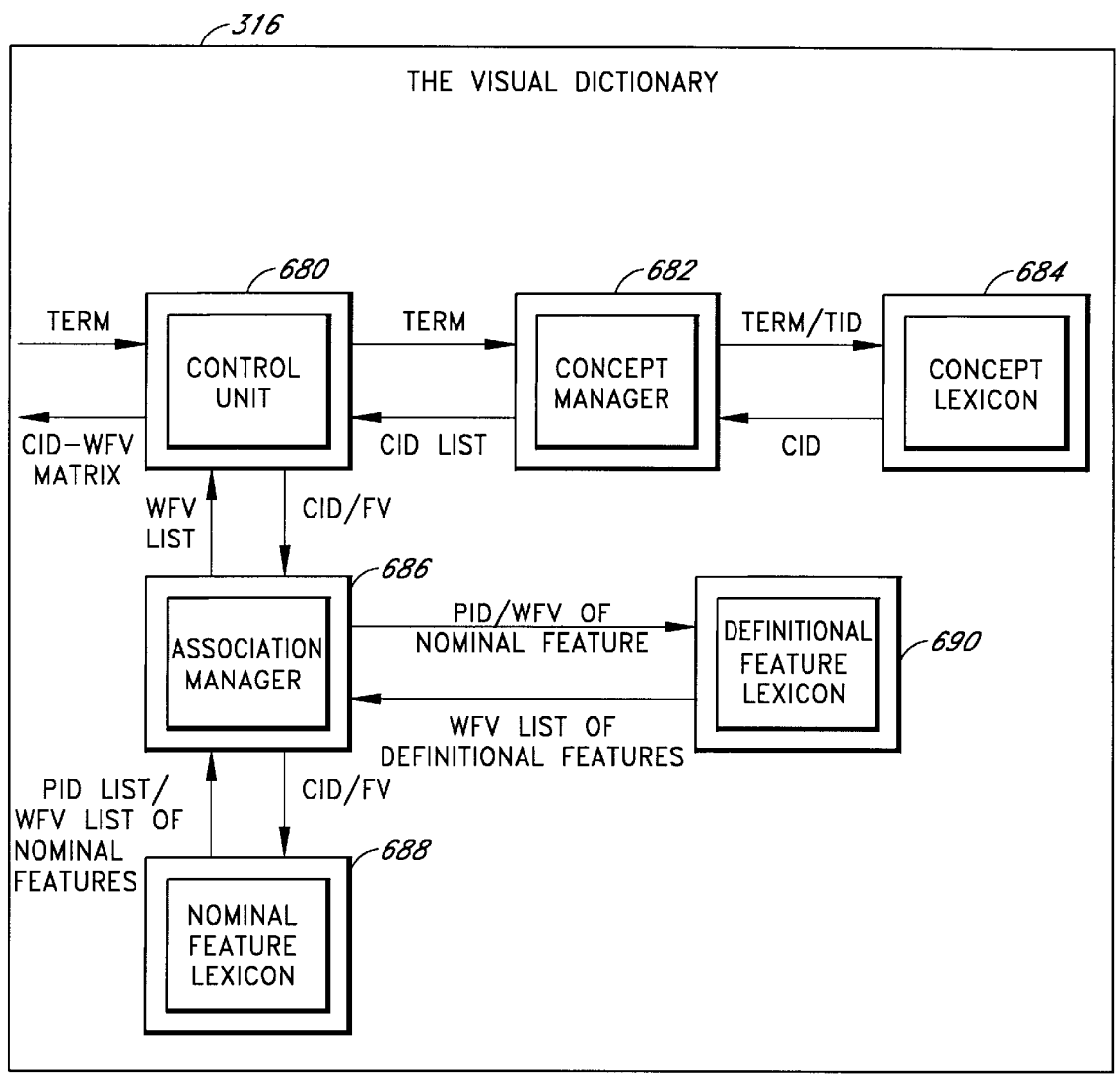
FIG. 14 is a block diagram showing one possible internal architecture of the victionary shown in FIG. 8 and the data flow between its components.

Referring to FIG. 14, the Victionary 316 has five major components, as described below:

1. Concept Manager 682: The Concept Manager module 682 controls a central component of the Victionary 316 referred to as a Concept Lexicon 684, which is a list of phrases that the dictionary is capable of handling, together with an internal identifier, referred to as a concept ID (CID), which an Association Manager 686 (described hereinbelow) uses. The content of the Concept Lexicon 684 depends completely on the domain of application of the Victionary 316, and is outside the scope of this invention. Concepts can be categorized into several types, designated by a list of type identifiers (TIDs). The embodiment described in this specification distinguishes between two distinct categories of visual concepts: descriptor concepts that roughly correspond to noun phrases, and qualifier concepts, that roughly correspond to adjective phrases (e.g., "red"). Other embodiments may use other types of concepts, such as image-centric concepts and object-centric concepts, surface boundarycentric concept or surface texture-centric concept, and so on. The Concept Lexicon 684 can be preferably accessed in four different ways:

a) Direct Access: In this situation the Victionary 316 is invoked with a term and the Concept Manager 682 uses a Lexicon traversal mechanism to identify the concept and returns the CID. The simplest embodiment of the Victionary 316 only has this option.

b) Access through Concept Types: An index of concept types is locally maintained within the Concept Manager 682. Using this index, the Concept Manager 682 returns the TID, given the CID of a concept. For the purpose of simplicity, a CID has a single TID in this embodiment, although specific domains need not conform to this restriction.

c) Access through a internal Concept Association Network: A Concept Association Network has the same purpose as a thesaurus, namely, relating different concepts. However, while a thesaurus associates a concept with its synonyms, homonyms, hyponyms and so on, the Concept Association Network relates concepts by what should be retrieved. Optionally, it also labels an association with a strength of relevance. Thus, although as per Roget's Thesaurus, the concepts "leaf", "turf" and "tree" are all hyponyms of the concept "plant", "turf" should be far less relevant than "tree" for semantic co-retrieval with "leaf" in the Victionary 316.

d) Access through an external Concept Management Software: In this case the user's concept is passed through a Victionary interface to an external software program such as a thesaurus engine. The thesaurus engine retrieves equivalent concepts, which are then used by the Concept Manager for Direct Access.

2. Definitional Feature Lexicon (DFL) 690: This specification refers to a feature as a data unit having four components: a feature identifier (FID), a feature vector produced by a known feature schema, a weight vector which defines a hyper-ellipsoid in the feature space, and possibly an additional set of parameters used during computation or comparison of the features. These parameters are taken to have been produced by a media engine that was used to create the DFL. In this document we refer to every member of the DFL as an example feature. The lexicon is called definitional because it covers the examples provided by the user for every CID. The technical rational behind the example feature is explained below.

The Victionary 316, as mentioned before, is example-based rather than model based. A model-based approach identifies a concept with a single region of definition in the feature space, while an example-based approach identifies several disjoint regions in the feature space that are perceptually or semantically associated with the same concept. FIG. 6 shows how these different regions may look like in a hypothetical two dimensional feature space. Each of the disjoint regions in the feature space is called a "prototype". The concept is represented as a disjoint collection of prototypes. Once the designer of the Victionary has identified the prototypes, the designer provides a number of examples from each prototype, so that in the feature space, these models approximately define the region covered, as shown in the example of FIG. 7. Since a feature vector defines a point in the feature space, and the weight vector defines a hyper-ellipsoid around it, one will need several smaller hyper-ellipsoids to span the region of definition and minimal additional regions. The DFL is preferably accessed through the Association Manager.

3. Nominal Feature Lexicon 688: Distinct from the DFL 690, the Victionary 316 also stores a Nominal Feature Lexicon (NFL), also accessed through the Association Manager 686. A nominal feature is computed after the DFL 690 is generated by a media engine, such as the VIR engine. The Query Processor 318 (FIG. 8) utilizes the VIR engine. Generation of the DFL is further described in the Creating Synonyms section hereinbelow. The purpose of a nominal feature is to represent a single "ballpark region" in feature space for each prototype (designated by a PID) of every CID. This is achieved by a process that computes one hyper-ellipsoid that covers the definitional region. In all likelihood, this nominal feature will also cover additional regions in the feature space that are near but not included in the definitional region. This computation may be conducted either inside the Victionary in one embodiment, or by an outside agent while creating the Victionary in another embodiment.

4. Association Manager 686: The Association Manager 686 has three functions. The Association Manager 686 maintains a data structure that indexes a concept to the NFL 688 and DFL 690. The data structure preferably is a B-tree indexing structure, although other indexing structures, such as a hash table, may be used. This data structure allows the user to perform the following operations:

a) NFL 688
  i) Function 1: Given a CID, it returns the nominal features of its prototypes.
  ii) Function 2: Given a feature vector, it returns a list of concept-prototype (CID-PID) pairs. The list represents all nominal features that the input feature vector is included in. Optionally, this list may be ranked in order of the distance of the input feature vector from a Nominal Feature Vector (NFV). This computation may be performed either within the Victionary, or by using the media engine of the system 310 where the Victionary is implemented.
  iii) Function 3: A variant of the second function, given a feature vector and a weight vector as input, it returns a list of (CID-PID) pairs. The list represents all nominal features the input feature region intersects.

b) DFL 690
  i) Function 1: Given a (CID-PID) pair, it gets all its example features. A variant is to just use the CID to get the examples.
  ii) Function 2: Given a feature vector and a CID, it returns a ranked list of PIDs. This computation may be performed either within the Victionary, or by using the media engine of the system where the Victionary is implemented.
  iii) Function 3: Given a qualifier concept and an example feature of descriptor concept, it modifies the example feature vector of the descriptor concept by the qualifier, and returns the modified feature vector. For example, a concept "yellow flower" can be generated by modifying all example features of the concept "flower" by changing the color primitive, as described in A. Gupta, "Visual information retrieval: a VIRAGE perspective", *White Paper, Virage, Inc.*, 1995, of the example features of flower.

5. Controller Unit 680: The Victionary 316 mainly communicates with the Query Transformer 314 through an API, which reflects the functionality described above. In another embodiment, the Victionary also interacts with a Content Management Engine or a Text Engine (not shown). In a still further embodiment, if the specific Victionary is very large, it exchanges information with a back-end storage or database server (not shown).

VI. Determining Equivalent Features within a Visual Dictionary

Figure 15:
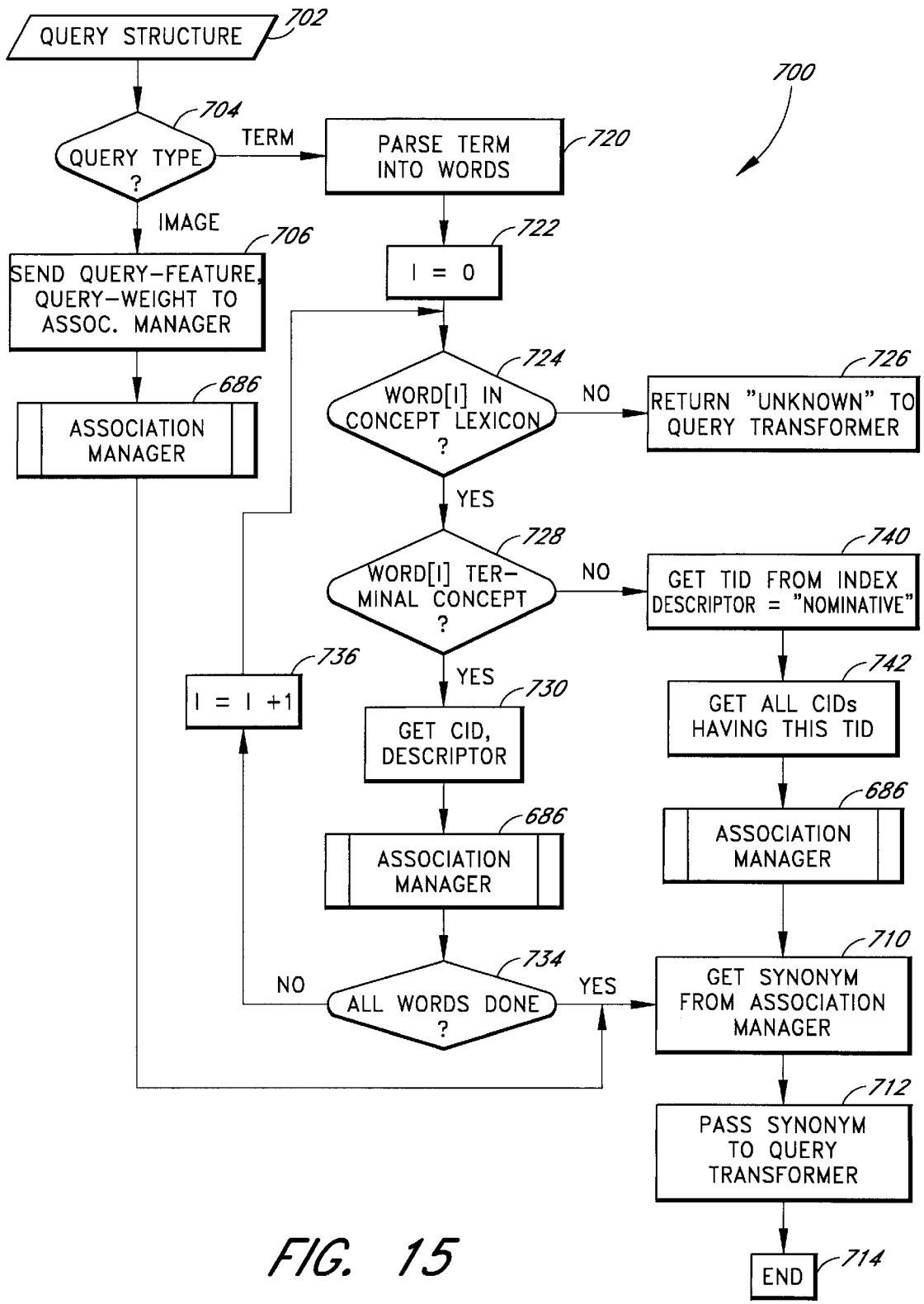
FIG. 15 is a flowchart of the process performed by the control unit and concept manager shown in FIG. 14.

Referring to FIG. 15, one embodiment of the Victionary 316 (FIG. 8 and 14) uses the following steps to determine the feature vectors equivalent to a term or an image query. These steps assume that the Victionary 316 has received the variable called QUERY-STRUCTURE from the Query Transformer 314 as discussed above. The Victionary 316 returns the variable SYNONYM to the Query Transformer 314 after executing the following steps of a Control Unit and Concept Manager process 700.

Process 700 begins with receiving the QUERY-STRUCTURE 702 from the Query Transformer 314 (FIG. 8). Moving to a decision state 704, the Control Unit portion of process 700 determines whether the type of user query by checking the variable QUERY-TYPE. If the type of query is Image, process 700 proceeds to state 706 and sends QUERY-TYPE, QUERY-FEATURE and QUERY-WEIGHT to the Association Manager process 686. Next, process 700 invokes the Association Manager 686 to index a concept to the NFL 688 (FIG. 14) and DFL 690. The Association Manager process 686 will be further described in conjunction with FIG. 16 below. At the completion of the Association Manager 686, process 700 moves to state 710 wherein the Concept Manager portion of process 700 receives the SYNONYM structure returned by the Association Manager 686. Continuing at state 712, process 700 passes the SYNONYM structure to the Query Transformer 314 and then completes process 700 at an end state 714.

Returning the discussion to decision state 704, if the type of query is determined to be Term, the Control Unit portion of process 700 passes the term to the Concept Manager portion of process 700 and moves to state 720. At state 720, process 700 parses the term to isolate individual words and places the words the words into a list called WORD. Proceeding to state 722, process 700 initializes a variable I, used to index the list WORD, to zero. Advancing to a decision state 724, process 724 determines if the word query WORD [I] is in the concept lexicon 684 (FIG. 14). If the indexed word query is not known to the concept lexicon, process 700 proceeds to state 726 and returns with a status of UNKNOWN to the Query Transformer 314 (FIG. 8). In another embodiment, the system 310 may use a text thesaurus to find the synonym of the unknown term.

If the indexed word query is known to the concept lexicon, as determined at decision state 724, process 700 continues at a decision state 728 to determine if the indexed word query is a known terminal concept. A terminal concept is a concept that has not been further divided, e.g., "clear sky". If so, the Concept Manager portion of process 700 provides a CID, and a DESCRIPTOR at state 730. The CID and the DESCRIPTOR are saved in temporary storage. The DESCRIPTOR specifies whether the term is a nominative or a qualifier term. At the completion of state 730, process 700 invokes the Association Manager process 686 with QUERY-TYPE, CID and DESCRIPTOR. At the completion of the Association Manager 686, process 700 proceeds to a decision state 734 to determine if all the words of the parsed query term (from state 720) have been processed. If so, process moves to state 710 and receives the SYNONYM structure returned by the Association Manager 686. However, if all the words of the parsed query are not done, as determined at decision state 734, process 700 proceeds to state 736 wherein the value of index I is incremented by one to access the next word in the parsed term at state 724.

Returning to decision state 728, if the indexed word query is not a known terminal concept, but is a known abstract concept, process 700 moves to state 740. An abstract concept is a concept that has been further divided, e.g., "sky" is further divided into "clear sky" and "cloudy sky". At state 740, the Concept Manager portion of process 700 provides a TID, and variable DESCRIPTOR is set to a value of NOMINATIVE. The Concept Manager accesses an indexing structure, such as a B-tree or hash table with the indexed word query to obtain the TID. Continuing at state 742, process 700 utilizes the TID obtained at state 740 to search another internal index or table to find all CIDs corresponding to the TID. For example, if the TID corresponds with "sky", the CIDs may include "clear sky" and "cloudy sky". The index search can utilize any search method, such as a B-tree method. The CIDs temporarily stored in memory. At the completion of state 742, process 700 invokes the Association Manager process 686 with QUERY-TYPE, CID(s) and DESCRIPTOR. At the completion of the Association Manager 686, process 700 proceeds to state 710 to receive the SYNONYM structure as previously described.

Figure 16A:
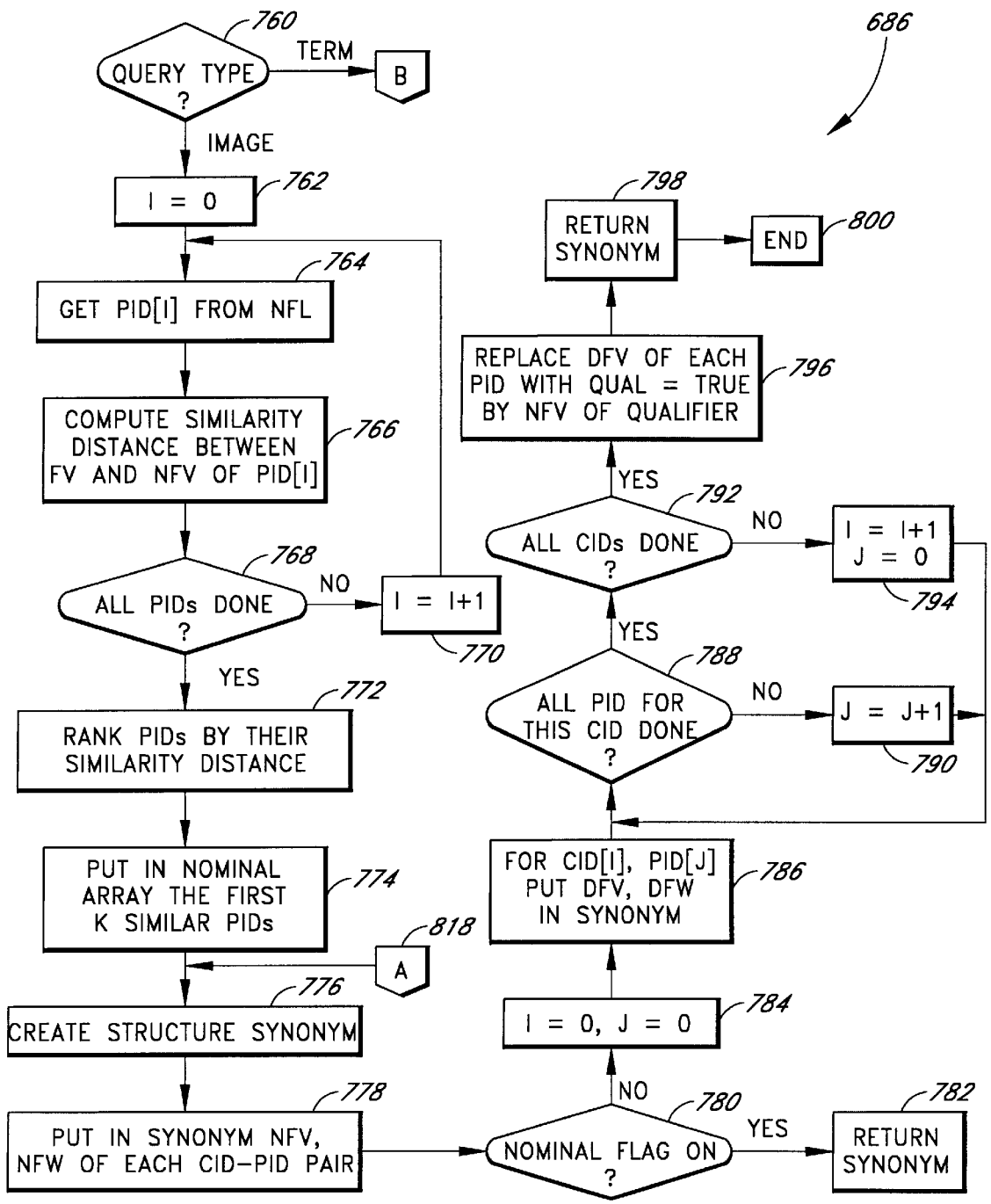
FIG. 16 is a flowchart of the process performed by the association manager shown in FIG. 14.
Figure 16:
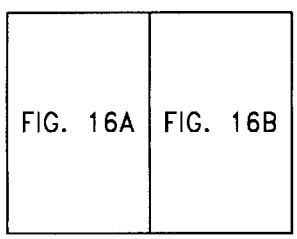
Figure 16B:
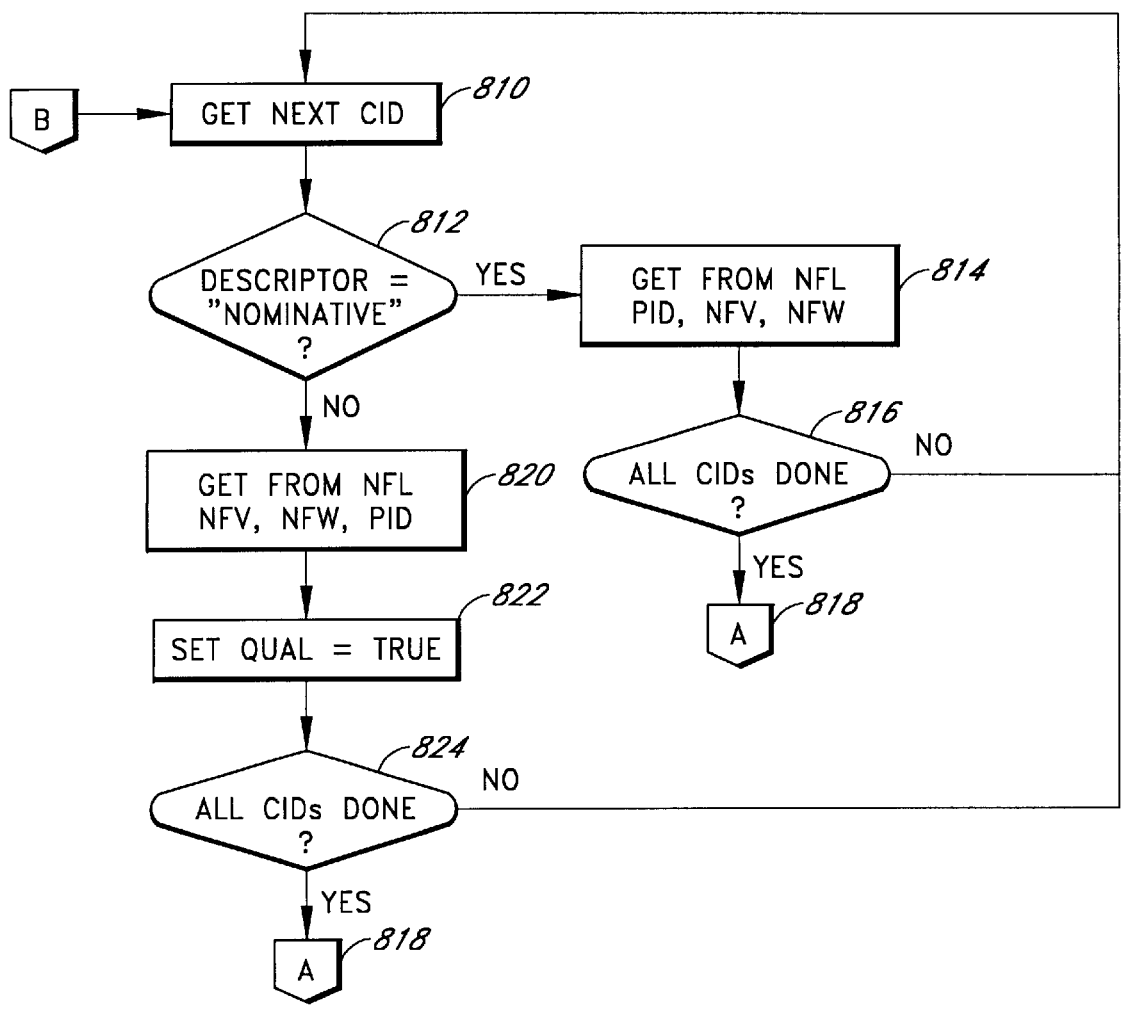

Referring to FIG. 16, the Association Manager process 686, shown in FIGS. 14 and 15, will now be described. Beginning at a decision state 760, process 686 determines the type of user query. If QUERY-TYPE is Image, process 686 moves to state 762 and initializes an index variable I to zero. Proceeding to state 764, process 686 obtains PID [I] from the NFL 688 (FIG. 14). The PID is obtained by querying the NFL 688, wherein the NFL indexes on CID values using a standard structure such as a B-tree. Note that each PID corresponds to a visual sense (row) and that a NFV has an associated PID to uniquely identify the NFV. Proceeding to state 766, process 686 invokes the Query Processor 318 (FIG. 8) with the Nominal Feature Vector obtained at state 764, and the QUERY-FEATURE and QUERY-WEIGHT received from process 700 (FIG. 15). The Query Processor 318 computes a similarity distance between the NFV of PID [I] and the QUERY-FEATURE (i.e., the Feature Vector) representing the query image. At the completion of state 766, process 686 advances to state 768 to determine if all PIDs have been processed. If not, process 686 proceeds to state 770 to increment the value of index I by one and moves back to state 764 to get the next PID [I] from the NFL 688. When all PIDs have been processed, as determined at state 768, each PID has a computed similarity distance in terms of their similarity with QUERY-FEATURE. Moving to state 772, process 686 ranks the PIDs in a list by their similarity distance. Continuing at state 774, process 686 uses a predetermined threshold to identify the "K" most similar PIDs, and places each of these PIDs, and the associated Nominal Feature Vector (NFV) and Nominal Feature Weight (NFW) for the PID, in an array called NOMINAL.

Continuing at state 776, process 686 generates a data structure called SYNONYM. An example SYNONYM data structure having rows and columns is shown in FIG. 17. At this point in the process 686, the features for each CID are populated by the corresponding NOMINAL array, i.e., the Nominal Feature Vector and Nominal Feature Weight of each CID-PID pair are entered into the SYNONYM structure. CIDs are utilized for Term type queries not for Image type queries. However, if the type of query is Image, a default CID is assigned for the image query to generalize process 686 for all query types. Advancing to a decision state 780, process 686 determines if the NOMINAL-FLAG is set (ON) in QUERY-STRUCTURE. As previously described, NOMINAL FLAG is normally clear (OFF), but application logic may set the flag. If set (ON), NOMINAL FLAG only retrieves a nominal vector. If the NOMINAL FLAG is set, process 686 returns the SYNONYM structure at state 782 and completes process 686.

If the NOMINAL FLAG is clear (OFF), as determined at decision state 780, process 686 advances to state 784 wherein index variables I and J are both initialized to a value of zero. Process 686 then advances to a loop at states 786-794 to populate the SYNONYM structure. At state 786, for CID [I] and PID [J], process 686 queries the DFL 690 (FIG. 14) to get back an array called DEFINITIONAL with columns: FID, Definitional Feature Vector (DFV) and Definitional Feature Weight (DFW). Process 686 moves to a decision state 788 to determine if all PIDs for the current CID are done. If not, process 686 proceeds to state 790 to increment the value of index J by one and move back to state 786 to query DFL 690 again. When all PIDs for the current CID are done, as determined at state 788, process 686 advances to a decision state 792 to determine if all CIDs are processed. If not, process 686 proceeds to state 794 to increment the value of index I by one, reinitialize the value of index J to zero, and move back to state 786 to query DFL 690 again. When all CIDs are done, as determined at state 792, process 686 updates the SYNONYM structure by replacing the array NOMINAL with the array DEFINITIONAL.

Continuing at state 796, process 686 checks each PID of SYNONYM to determine if QUAL (Qualifier is further described hereinbelow) is TRUE. If so, process 686 replaces the Definitional Feature Vector of the PID with the Nominal Feature Vector of the Qualifier. This is accomplished by unpacking the Definitional Feature Vector in the SYNONYM structure to extract the components of the DFV and replacing the active component of the Definitional Feature Vector with the active component from the Qualifier. Process 686 then repacks the modified Definitional Feature Vector. Moving to state 798, process 686 returns the SYNONYM structure to the Control Unit portion of process 700 (FIG. 15) and completes at an end state 800.

Returning to the decision state 760, if QUERY-TYPE is Term, process 686 moves to state 810 and accesses the temporary storage to get the first CID. The CID(s) were previously obtained and stored at state 730 or state 742 (FIG. 15). Proceeding to a decision state 812, process 686 determines if the variable DESCRIPTOR has a value of NOMINATIVE. If so, process 686 advances to state 814 and queries the NFL 688 (FIG. 14) to retrieve a list containing a PID, a Nominal Feature Vector, and a Nominal Feature Weight. The NFL 688 indexes on CID values using a standard structure such as a B-tree. Note that each PID corresponds to a visual sense. Moving to a decision state 816, process 686 determines if all CIDs are done. If so, process 686 proceeds through connector A 818 to state 776 wherein the SYNONYM data structure is generated, as previously described. However, if all CIDs are not done, as determined at decision state 816, process 686 moves back to state 810 to access the next CID.

Returning to the decision state 812, if the variable DESCRIPTOR does not have a value of NOMINATIVE, i.e., DESCRIPTOR=QUAL (Qualifier) for the current word, e.g., "blue", of the Term query, e.g., "blue sky", process 686 continues at state 820. At state 820, process 686 queries the NFL 688 (FIG. 14) to get back a list having a PID, a Nominal Feature Vector, and a Nominal Feature Weight. The NFL indexes on CID values using a standard structure such as a B-tree. The Nominal Feature Vector for a Qualifier is structurally the same as that of a Nominative term, but preferably differs in the content of the component. For example, if the Qualifier pertains to color, only the color component of the Feature Vector is meaningful, while the other components are set to NULL. The meaningful component is referred to as the active component. At the completion of state 820, process 686 advances to state 822 wherein variable QUAL is set to TRUE for each Term having a Qualifier. Moving to a decision state 824, process 686 determines if all CIDs are done. If so, process 686 proceeds through connector A 818 to state 776, as previously described. However, if all CIDs are not done, as determined at decision state 824, process 686 moves back to state 810 to access the next CID.

VII. Creating Synonyms in the Victionary

Several methods can be used in creating the associations between concepts and their feature equivalents in the Victionary 316. In one embodiment, the process may be manual whereby a system designer decides which terms should be included in the Victionary and for each term, picks the example set to create the DFL. In another embodiment, the process can be semi-automatic, where the designer picks a number of pre-annotated images. The system reads the annotation of each and automatically creates an association list, thereby relating each annotation word with a list images. Those annotation words that have less than a predefined list of images can be dropped. After this construction, the system designer manually reviews whether each word has a proper representative set of image examples. Still more sophisticated systems can employ pattern classification techniques to automatically group example images into visual classes, which can then be used as an automatic visual sense determination mechanism in the Victionary. As indicated earlier, a large body of literature exists in Computer Vision and Pattern Recognition research that uses machine learning techniques toward grouping examples into categories and several of these techniques can also be used in creating the synonyms for the Victionary.

VIII. Extensibility of the Victionary

There are two primary approaches to extend the scope of the Victionary 316 (FIG. 8). Extensibility of the query system is discussed in Applicant's U.S. patent application Ser. No. 08/829,791, filed Mar. 28, 1997, for "SIMILARITY ENGINE FOR CONTENT-BASED RETRIEVAL OF OBJECTS". The first primary approach is designing the Victionary to be a plug-in module, such that any number of victionaries can be associated with a single query system. The query system can then select one or more victionaries at query time and combine their results. With this flexibility, the query system 310 gains the previously unattained capability of adding domain knowledge to customize the similarity retrieval task for a specific problem In one embodiment, the plug-in architecture has the following application programming interface (API) functions:

1. RegisterVictionary
   a) Input: victionary name, feature schema used by victionary, pointers to the functions GetSynonyms, AddSynonyms and DeleteSynonyms, identifier of the text thesaurus used by the feature lexicon if any, and identifier of the database used by the feature vector, if any.
   b) Output: a victionary id
   c) Function: The system verifies that the function pointers of the input, the thesaurus and the database used are valid.
2. UnRegisterVictionary
   a) Input: victionary id
   b) Output: a success/failure notification c) Function: The system removes all internal references to the victionary and any space allocated to it.
3. ConfigureVictionary
   a) Input: victionary id, the element to be changed and the modified element
   b) Output: a success/failure notification
   c) Function: This is used, for example to change any of the initial parameters of a registered victionary such as the victionary name, feature schema used by victionary, pointers to the functions GetSynonyms, AddSynonyms and DeleteSynonyms, identifier of the text thesaurus used by the feature lexicon, and identifier of the database used by the feature vector.
   d) Example Usage: IF (ConfigureVictionary(v35, TextThesaurus, "/usr/local/lib/thes2.db") NOT-EQUAL-TO "ok") PRINT "Configuration Error"
4. CreateVictionaryInstance
   a) Input: victionary id
   b) Output: a handle to a newly created instance of the victionary
   c) Function: It creates a new victionary process and returns a handle to that process to the user. The user can then use the handle to make further operations on the victionary
5. DeleteVictionaryInstance
   a) Input: victionary instance handle
   b) Output: a success/failure notification
   c) Function: The system removes all internal references to the referred instance of the victionary and any space allocated to it.
6. AddConcept
   a) Input: a victionary id, a concept word
   b) Output: a concept handle
   c) Function: It creates an entry in the concept lexicon
7. DefineConcept
   a) Input: a victionary id, a concept handle, an example feature vector
   b) Output: a success/failure notification
   c) Function: It creates an entry in the DFL with the feature vector, and updates the NFL with the new entry
8. DeleteConcept
   a) Input: a victionary id, a concept handle
   b) Output: a success/failure notification
   c) Function: The system removes all internal references to the concept and its definitions within the victionrary and any space allocated to it.
9. GetSynonyms
   a) Input: a victionary instance handle, a QUERY-STRUCTURE as described before
   b) Output: the SYNONYM structure as described before
   c) Function: get synonyms as shown in FIG. 17 and described in the text A second approach to extending the Victionary is to generalize the victionary concept to other media types such as video and audio. It has been reported how to characterize audio segments into feature vectors for content-based retrieval. The commentators also reported that perceptual audio concepts such as "laughter", "ringing bells" can be acoustically shown to have diverse feature characteristics. Following this example, having an audio equivalent of the Victionary involves two changes to the embodiment described above:
1. The first change involves replacing the visual feature-based query processing engine with an audio feature-based engine. Alternatively, a multimedia engine can be used such that a single engine computes feature vectors from multiple media types and compares features created from any registered media.
2. The second change involves providing the query transformer with the power to identify whether a term should be expanded using an audio dictionary (rather than the visual dictionary). This can be easily accomplished by first querying each dictionary to enquire if the term is in its concept lexicon, and then either sending it to the dictionary that responds positively, or in case of multiple responses, by requesting user intervention.

While the above detailed description has shown, described, and pointed out the fundamental novel features of the invention as applied to various embodiments, it will be understood that various omissions and substitutions and changes in the form and details of the system illustrated may be made by those skilled in the art, without departing from the intent of the invention.

What is claimed is:
1. A visual query processing method, comprising:
   providing a user query;
   applying the user query to a visual dictionary comprising a plurality of feature vectors so as to generate a set of query vectors; and
   applying the query vectors to an image database comprising a plurality of images so as to provide a list of similar images.
2. The method defined in claim 1, wherein the user query comprises a text term.
3. The method defined in claim 1, wherein the user query comprises an image.
4. The method defined in claim 1, additionally comprising:
   rank ordering the list of images by degree of similarity; and
   presenting the rank-ordered images to a user.
5. The method defined in claim 1, wherein at least one of the feature vectors has an associated weight.
6. The method defined in claim 1, wherein at least one of the feature vectors has a nominal component.
7. The method defined in claim 1, wherein at least one of the feature vectors has a definitional component.
8. A visual query processing system, comprising:
   a visual dictionary, comprising feature vectors representative of images, capable of receiving a user query so as to select a set of feature vectors representative of the user query;
   a query transformer that transforms the selected set of feature vectors into a set of image queries; and
   a query processor receiving each separate query so as to index an image database comprising a plurality of images.
9. The system defined in claim 8, additionally comprising a result processor that receives the results of the query processor and ranks the individual query results into a composite response.
10. The system defined in claim 8, wherein each feature vector has an associated weight.
11. The system defined in claim 9, additionally comprising a query parser for parsing the user query.
12. The system defined in claim 11, wherein a set of application programming interfaces are associated with the visual dictionary and query transformer for interfacing with the query processor, query parser and result processor.
13. The method defined in claim 1, wherein the user query comprises a video sequence.

14. The system defined in claim 8, wherein the user query comprises an image, a text term, or a video sequence.

15. A visual query processing method, comprising:
providing a user query having one or more user weights;
applying the user query to a visual dictionary comprising a plurality of feature vectors so as to generate a set of query feature vectors, wherein each of the query feature vectors has an associated feature weight; and
applying the query feature vectors and query feature weights to an image database comprising a plurality of images so as to provide a list of similar images.

16. The method defined in claim 15, wherein the user query comprises a text term.

17. The method defined in claim 15, wherein the user query comprises an image.

18. The method defined in claim 15, wherein the user query comprises a video sequence.

19. The method defined in claim 15, additionally comprising:
rank ordering the list of images by degree of similarity; and
presenting the rank-ordered images to a user.

20. The method defined in claim 17, wherein a value of a selected user weight is set by a user.

21. The method defined in claim 20, wherein the value is associated with color, texture or shape.

22. The method defined in claim 20, wherein the value is indicative of a user's relative preference of one or more individual properties of the user query.

23. The method defined in claim 22, wherein the property is hue, saturation, intensity, edge density, randomness, periodicity, orientation, algebraic moments, turning angles, or elongatedness.

24. The method defined in claim 20, wherein applying the user query comprises communicating a feature vector and the one or more weights corresponding with the user query to the visual dictionary.

25. The method defined in claim 24, wherein applying the user query further comprises determining an intersection of the feature vector and the one or more weights corresponding with the user query with the plurality of feature vectors of the visual dictionary.

26. The method defined in claim 15, wherein at least one of the feature vectors has a nominal component.

27. The method defined in claim 15, wherein at least one of the feature vectors has a definitional component.

28. A visual query processing method, comprising:
providing a user query;
applying the user query to a visual dictionary comprising a plurality of feature vectors so as to generate a set of query vectors, wherein each feature vector has a corresponding feature weight; and
applying the query vectors to an image database comprising a plurality of images so as to provide a list of similar images.

29. The method defined in claim 28, wherein the user query comprises a text term.

30. The method defined in claim 28, wherein the user query comprises an image.

31. The method defined in claim 28, wherein the user query comprises a video sequence.

32. A visual query processing system, comprising:
a visual dictionary, comprising feature vectors representative of images, capable of receiving a user query having one or more user weights so as to select a set of feature vectors representative of the user query; and
a similarity comparison engine receiving the selected set of feature vectors and generating a list of similar images.

33. The system defined in claim 32, wherein images identified in the list of similar images substantially satisfy the user query.

34. The system defined in claim 32, wherein the similarity comparison engine includes a query transformer that transforms the selected set of feature vectors into a set of image queries, and a query processor receiving each separate query so as to index an image database comprising a plurality of images.

35. The system defined in claim 32, wherein each feature vector has an associated weight.

36. The system defined in claim 35, additionally comprising a query parser for parsing the user query, wherein the output of the query parser comprises a query feature vector and an associated query feature weight structure corresponding with the user weights.

37. The system defined in claim 36, wherein the visual dictionary comprises an association manager that determines a similarity distance between the query feature vector and the query feature weight structure to the feature vectors and associated weights of the visual dictionary.

38. The system defined in claim 32, wherein the user query comprises an image.

39. The system defined in claim 32, wherein the user query comprises a video sequence.

40. The system defined in claim 32, wherein a value of a selected user weight is set by a user.

41. The system defined in claim 40, wherein the value is indicative of a user's relative preference of one or more individual properties of the user query.

42. The system defined in claim 41, wherein the property is selected from the group consisting of color, texture and shape.

43. A visual query processing system, comprising:
a visual dictionary, comprising feature vectors representative of images, receiving a user query comprising a query image or one or more text terms so as to select a set of feature vectors representative of the user query;
a query transformer that transforms the selected set of feature vectors into a set of image queries; and
a query processor receiving each separate image query so as to index an image database comprising a plurality of images.

44. The system defined in claim 43, wherein each feature vector has an associated weight.

45. The system defined in claim 43, additionally comprising a query parser for parsing the user query, wherein the output of the query parser comprises a set of terms in a term structure and a combinator associated with the text terms.

46. The system defined in claim 45, wherein the combinator represents a type of user-supplied combination condition comprising "OR"or "AND".

47. The system defined in claim 46, wherein the query transformer operates on the selected set of feature vectors according to the combinator.

48. The system defined in claim 47, wherein the query transformer performs an intersection of the terms in the term structure if the combinator is "AND".

49. The system defined in claim 43, additionally comprising a query parser for parsing the user query, wherein the output of the query parser comprises a query feature vector and an associated query feature weight structure.

50. The system defined in claim 49, wherein the query transformer operates on the selected set of feature vectors according to the query feature vector and the query feature weight structure.

* * * * *

UNITED STATES PATENT AND TRADEMARK OFFICE
CERTIFICATE OF CORRECTION

PATENT NO. : 5,983,237 Page 1 of 1
DATED : November 9, 1999
INVENTOR(S) : Jain et al.

It is certified that error appears in the above-identified patent and that said Letters Patent is hereby corrected as shown below:

<u>Column 1,</u>
Line 14, please insert:

-- <u>Governmental Rights</u>
This invention was made with Government support under Contract No. DAAH01-97-C-R190, awarded by U.S. Army Aviation and Missile Command, Contract No. F33615-96-C-5615, awarded by Wright Laboratories, U.S. Air Force and Contract No. DAAH01-96-C-R121, awarded by U.S. Army Missile Command. The Government may have certain rights in this invention. --

Signed and Sealed this

Eighteenth Day of June, 2002

*Attest:*

*Attesting Officer*

JAMES E. ROGAN
*Director of the United States Patent and Trademark Office*

UNITED STATES PATENT AND TRADEMARK OFFICE
CERTIFICATE OF CORRECTION

PATENT NO.  : 5,983,237
DATED       : November 9, 1999
INVENTOR(S) : Jain et al.

It is certified that error appears in the above-identified patent and that said Letters Patent is hereby corrected as shown below:

Column 24,
Line 54, please change "defmed" to -- defined --.

Signed and Sealed this

Twenty-seventh Day of August, 2002

Attest:

JAMES E. ROGAN
Attesting Officer  Director of the United States Patent and Trademark Office